(12) United States Patent
Feinberg

(10) Patent No.: US 6,415,295 B1
(45) Date of Patent: Jul. 2, 2002

(54) STORING PERSONAL MEDICAL INFORMATION

(76) Inventor: Lawrence E. Feinberg, 2882 Dominique Dr., Galveston, TX (US) 77551

(*) Notice: Subject to any disclaimer, the term of this patent is extended or adjusted under 35 U.S.C. 154(b) by 0 days.

(21) Appl. No.: 09/491,546

(22) Filed: Jan. 26, 2000

Related U.S. Application Data

(63) Continuation of application No. 08/852,336, filed on May 7, 1997, now Pat. No. 6,082,776.

(51) Int. Cl.[7] ............................................. G06F 17/30
(52) U.S. Cl. ................................................. 707/104.1
(58) Field of Search ..................................... 707/104.1

(56) References Cited

U.S. PATENT DOCUMENTS

| | | | | |
|---|---|---|---|---|
| 4,817,050 A | * | 3/1989 | Komatsu et al. ............. | 358/403 |
| 5,251,131 A | * | 10/1993 | Masand et al. .............. | 704/9 |
| 5,542,087 A | * | 7/1996 | Neimat et al. ............... | 707/10 |
| 5,794,208 A | * | 8/1998 | Goltra ........................... | 705/1 |
| 5,950,207 A | * | 9/1999 | Mortimore et al. .......... | 707/100 |
| 6,082,776 A | * | 7/2000 | Feinberg ....................... | 128/904 |
| 6,234,964 B1 | * | 5/2001 | Iliff .............................. | 600/300 |
| 6,272,481 B1 | * | 8/2001 | Lawrence et al. ............ | 706/10 |

* cited by examiner

*Primary Examiner*—Wayne Amsbury
(74) *Attorney, Agent, or Firm*—Conley, Rose & Tayon, P.C.; Jonathan M. Harris

(57) ABSTRACT

A system and method for data compression of structured medical history information using multiple, updatable, static dictionaries in conjunction with an advanced probability-based model. The system is not a free text, word or phrase compressor as is presented in generalized or universal data compression systems. It employs a series of static dictionaries consisting of structured data developed from standardized medical classifications of disease, disorders, surgical procedures and medications. Prior probability information is utilized to achieve a high level of data compression of multiple data items at a time. The dictionaries are designed for flexible updating, efficient storage and retrieval, and data integrity. A portable medical card may be imprinted with the compressed medical information.

59 Claims, 13 Drawing Sheets

MediKey ™

4/18/97-20:45

Personal Medical Summary

Johnson, Jenny A
ID: 137887654

| | | | |
|---|---|---|---|
| Age: | 76 yrs | | Weight-lbs: 140-149 |
| Sex: | Female | UPDATED: APR 18,1997 | Height ft-in: 5.6-5.8 |
| Race: | White | | Blood: A+ |

Name: Johnson, Jenny A
Address: 558 Salem Avenue Portland Ore 67666 (204)544-3456
Next of Kin: Bob N Johnson (204)565-9000
Doctor: Dr. William Rogers (204)345-9987
E-mail: wrogers@portland.clinic.edu
Insurance: Northwest Healthcare Inc #ERE-7865-SD12 (204)334-4000

Warning: Digoxin, Lasix, Insulin, Donor, EKG, Directives
PsySocHx: Alcohol: Occasional   Drugs: Denies   Tobacco: 21-40 packyrs   HIV: Unknown
ObGynHx: G4P3AbOLC2   (G=#Preg  P=#Births  AB=#Aborts  LC=#Living Children)
Allergy: Penicillin, Sulfonamide Meds:
(1) Digoxin (Digoxin) 0.0625mg bid (Twice daily)
(2) Lasix (Furosemide) 20mg qd (Once daily)
(3) Insulin Regular (9am-10 Units) (4pm-13 Units) (9pm-9 Units)

PMHx:
(1) Diabetes Mellitis Uncomplicated Type II AODM DM -- Current (ICD:250.00)
(2) Unspecified Essential Hypertension HTN -- Current (ICD:401.9)
(3) Chronic Ischemic Heart Disease Unspscified IHD -- Current (ICD:414.9)
(4) Chronic Obstructive Asthma And Pulmonary Disease -- Current (ICD:493.2)

PSHx: None

FamilyHx: Diabetes Mellitus Dm, Ischemic Heart Disease, Malignant Neoplasm Of Genital Organ, Malignant Neoplasm Of Breast Immuns: MMR, DPT (1992), Polio
Screening: Flu(1996) PneuV(1996) ColoSIG(Pre-1995) MMG(1995) PAP(1996)
Donor: Liver, Cornea, Kidney, Skin
Directives: Durable Power of Attorney, Living Will
EKG/ECG: 1997 - AFIB/AFLUT LBBB

*End Of Report*

(c) 1996-97 RSI Medical Research Inc.   Confidential Report   PV 1234434560   PDV1. 10/1.10

Structured Medical Classification(s)

ICD9-CM

Diagnoses

Contains whole data items code and description, ordered by code

| Code | Disease/Disorder Description |
|---|---|
| 003. | Other Salmonella Infection |
| 003.0 | Salmonella Gastroenteritis |
| 003.1 | Salmonella Septicemia |
| 003.2 | Localized Salmonella Infection |
| . | |
| 401.9 | Essential Hypertenson |
| . | |
| 537.1 | Gastric Diverticulum |
| 537.2 | Chronic Duodenal Ileus |
| . | |
| 537.8 | Other Specified Disorders Of Stomach And Duodenum |
| 537.82 | Angiodysplasia Of Stomach And Duodenum |
| . | |
| V82.9 | ------------------------------------------------ |

Surgical Procedures

Contains whole data items code and description, ordered by code

| Code | Procedure Description |
|---|---|
| 35-39 | Operations On The Cardiovascular System |
| 35 |     Operations On Valves And Septa Of Heart |
| 35.0 | Closed Heart Valvotomy |
| 35.00 | Closed Heart Valvotomy Unspecified Valve |
| 35.01 | Closed Heart Valvotomy Aortic Valve |
| . | . |
| 35.1 | Open Heart Valvuloplasty Without Replacement |
| 35.10 | Open Heart Valvuloplasty Without Replacement Unspecified Valve |
| 35.11 | Open Heart Valvuloplasty Of Aortic Valve Without Replacement |

NDC

Medications

Contains whole data items code and description

| Generic and brand names | Recid |
|---|---|
| : | : |
| Ace | 28 |
| Acebutolol HCl | 29 |
| Acetaminophen | 30 |
| Acetaminophen No. 2 | 31 |
| Acetaminophen No. 3 | 32 |
| Acetaminophen No. 4 | 33 |
| Acetaminophen w/Codeine | 34 |
| Acetaminophen w/Codeine Elixir | 35 |
| Acetaminophen/Butalbital | 36 |
| . | . |

FIG. 7

UPDATABLE STATIC DICTIONARY-ICD9-CM
Diagnoses (Dx)

| Code | Disease/Disorder Description | Version | Recid | Next |
|---|---|---|---|---|
| 003. | Other Salmonella Infection | 0 | 00001 | 0 |
| 003.0 | Salmonella Gastroenteritis | 0 | 00002 | 0 |
| 003.1 | Salmonella Septicemia | 0 | 00003 | 0 |
| 003.2 | Localized Salmonella Infection | 0 | 00004 | 14502 |
| 409.1 | Essential Hypertenson | | | |
| 537.1 | Gastric Diverticulum | 0 | 00005 | 0 |
| 537.2 | Chronic Duodenal Ileus | 0 | 00006 | 0 |
| 537.8 | Other Disorders Of Stomach/Duodenum | 0 | 00007 | 0 |
| 537.82 | Angiodysplasia Of Stomach/Duodenum | 0 | 00008 | 0 |
| ------- | ------------------------------------------------- | 0 | to | 0 |
| ------- | ------------------------------------------------- | 0 | 14500 | 0 |
| 550.01 | Recurrent Unilateral or Unspecified Inguinal Hernia with Gangrene | 0 | 14501 | 0 |
| 003.2 | Localized Salmonella NEC | 1 | 14502 | 0 |

ICD9 Procedures (Px)

| Code | Procedure Description | Version | Recid | Next |
|---|---|---|---|---|
| 35 | Operations On Valves Of Heart | 0 | 00002 | 0 |
| 35.0 | Closed Heart Valvotomy | 0 | 00003 | 0 |
| 35.00 | Closed Heart Valvotomy Other Valve | 0 | 00004 | 3501 |
| 35.1 | Closed Heart Valvotomy Aortic Valve | 0 | 00005 | 0 |
| 86.90 | Chronic Duodenal Ileus | 0 | 03500 | 0 |
| 35.00 | Closed Heart Valvotomy Single Valve | 0 | 03501 | 0 |

NDC Medications (Rx)

| Recid | Generic / brand names | Version | Next | Strengths | Freqs |
|---|---|---|---|---|---|
| 00028 | Ace | 0 | 0 | 100mg | qd |
| 00029 | Acebutolol HCl | 0 | 0 | 100mL | tid |
| 00030 | Acetaminophen | 0 | 0 | 50mg | bid |
| 00031 | Acetaminophen No. 2 | 0 | 0 | 50mg | prn |
| 00032 | Acetaminophen No. 3 | 0 | 0 | 50mg | tid |
| 00033 | Acetaminophen No. 4 | 0 | 0 | 50mg | bid |
| 00034 | Acetaminophen w/Codeine | 0 | 0 | 10mg | prn |
| 00035 | Acetaminophen w/Codeine Elixir | 0 | 0 | 50mL | tid |
| 00036 | Acetaminophen/Butalbital | 0 | 0 | 250mg | bid |

FIG. 8

* Ctl field is variable length. If first bit is 0, then Ctl is one bit long. This indicates that the group has ended. If first bit is 1, then the Ctl is two bits long and this indicates that this slot belongs to the same group.

Where 1 vocabulary symbol = 5 bits

Total = 40 bits / 5 bits per symbol = 8 characters

Compression ratio   160 / 8 = 20 : 1

STORING PERSONAL MEDICAL INFORMATION

This application is a continuation of application Ser. No. 08/852,336, filed May 7, 1997, entitled "Storing Personal Medical Information", now U.S. Pat. No. 6,082,776.

BACKGROUND OF THE INVENTION

The invention relates to storing personal medical information.

Personal medical information is typically stored in a centralized database and is typically accessed by identification number. Storage schemes that call for storing personal medical information on portable data cards have been proposed.

In today's increasingly mobile society, medical treatment is provided at a variety of locations, including offices of primary care physicians, specialists, clinics, hospitals, nursing homes, schools, homes, etc. When away from home on holiday or business, unexpected treatment is often delivered by yet another set of providers. Over a lifetime, an individual's medical records are distributed over a range of locations often separated by large distances. Even though this medical information is regularly needed, often or an urgent basis, its wide distribution over multiple locations does not lend itself to efficient communication. Even when records are available, they are primarily in the form of paper-based charts containing voluminous handwritten encounter notes, test results, files, hospital discharge summaries, diagnostic evaluations, laboratory images, etc. The difficulty of reviewing, extracting, and communicating vital information quickly from these paper charts is a known, serious problem. It is for this reason among others that traditional medical records in paper chart form are ineffective at the point of care. In several recent studies of paper-based medical records conducted by the General Accounting Office, the American Medical Association and others, it was found that in 30 percent of all medical encounters, the paper chart was unavailable. In one study performed by a principal of the Emergency Medical Association, the finding was that 50 percent of handwritten emergency department charts could not be properly evaluated due to poor handwriting. Paper charts are not only slow to arrive from medical records departments, but even when delivered, they are slow to communicate the necessary information to the clinician.

A recent paradigm associated with and conceptually dependent upon the Electronic Patient Record ("EPR") is the "portable" medical record. The concept is not new and the technology has been available in the form of patient cards or "smart cards" which have evolved in several industries over the past few years. The EPR is designed to be a comprehensive medical record containing detailed medical history along with clinical and demographic information. In some examples even the radiological images or other laboratory test graphics are included as well. The portable record contains a meaningful subset of such information. The prime advantage of the portable record is its mobility. Its main drawback compared to the EPR is that it has limited capacity to store information. As a result, it is not of much use to clinicians for decision support purposes since it does not have the capacity to store original information, e.g., images, discharge summaries or even "free text" physicians' notes. To help alleviate this drawback, the portable medical record should use compression schemes. These schemes effect faster information transfer and improve data storage efficiency.

The state of the art in compression/decompression technology employs several techniques to accomplish similar objectives. Of particular interest are dictionary based text compression schemes where such dictionaries may be static or dynamic. In general, dynamic or adaptive dictionaries may be appropriate when large amounts of repetitive information are to be exchanged between sender and receiver and where benefits can be derived via compression to minimize transmission time and also auxiliary storage requirements. A dynamic dictionary scheme is one where both the sender and receiver dictionaries are gradually created or adapted in "realtime: as the data exchange progresses. The only requirement for such a process to work is that both dictionaries must be synchronized with each other. As each new piece of information is being sent, the sender must determine whether it has this item in its dictionary. If not, then the new item must also be transmitted (uncompressed) to the receiver. This means that the new data item will be "recognized" from that time onwards. Dynamic compression schemes work because new data items and their dictionary entries are exchanged each time. This "overhead" may increase the time and storage requirements for each transmission. Existing, dynamic dictionary techniques may not lend themselves to portable medical record applications because the structured personal health history information is of small quantity and normally non-repetitive. The dynamic dictionary concept may not achieve the high levels of data compression required.

Schemes which use the dynamic, adaptive approach are referred to as universal data compression schemes. The most famous is the Lempel-Ziv algorithm. Popular compression systems such as the Unix compress, PKZIP and PKU ZIP also use the dynamic, adaptive method. There are many examples of dynamic dictionary compression schemes in the literature.

The portable medical record provides a means of transport of medical information from one physical location to another. It does this by allowing the patient to carry his own medical record on his person wherever he goes, and to produce it whenever treatment is required. The individual can decide to share the information with anyone he chooses or not. The issues of privacy or security do not arise since the individual has total control.

Previously, several types of medical card technologies have been developed. There are medical cards with barcodes, magnetic stripes, optical and microprocessor chip technology, all competing technologies. Microfiche medical cards have also been proposed over the years but they have not proliferated because they are very difficult to update.

Each of the foregoing methods has its features related to cost, information capacity, and operational characteristics. There are several features in common to these systems. Special cards, usually of plastic media format, are required to hold the medical information or, alternatively, the patient identification (ID) and personal identification (pin) number. Barcodes which are imprinted on the surface of plastic cards normally contain patient ID and pin number information which are used to retrieve the patient's medical records from remote computer databases. The barcode imprint is normally fixed and the barcode itself has limited storage capability.

The magnetic stripe is of limited capacity, but it may be updated over time with new information. The optical card or microprocessor chip technology contains the greatest storage capacity, presently several millions of characters. The information recorded on these media are updatable over time. Thus, in the case of "smart cards" which utilize this technology, enough information may be stored on the card to reduce the requirement for access to remote computer databases. Recently, barcode technology has been enhanced with the arrival of the two dimensional barcode. Essentially, this has increased the data storage capacity of the barcode to hundreds of characters in a changeable medium.

The most significant drawback of these medical card technologies is that special hardware is necessary in the form of reader/writer devices or optical scanners to read or update the card. A PC with special computer-software is also necessary to interface these card readers. In the case of some "smart card" solutions, a dedicated PC and an electronic reader is required to control the process.

These competitive card technologies are competing for industry-wide acceptance. A broad acceptance is a prerequisite for success because these systems depend upon special electronic equipment which must be installed in all locations. The cost of the patient card media along with the administrative and maintenance costs of backup and regeneration of potentially large amounts of medical information is also a consideration should a card be lost or damaged. The special hardware and software requirement may make these solutions somewhat unattractive.

Patient card technologies require not only agreement on information standards, but also a financial and operational infrastructure to be in place to support it. The creation of such an infrastructure might well have benefitted from a government mandate, but this does not appear to be forthcoming with the demise of national healthcare reform. It, therefore, appears that the patient card will not evolve as quickly as was anticipated.

The portable medical record to be successful must provide increased access to medical information at the point of care, wherever that might be. Such a concept to be practical must not require a large up-front investment either by the provider, the public, or by sectors of the industry itself.

A portable medical record must also ensure confidentiality and privacy of information. This is a basic need and must be guaranteed. The only way to accomplish this absolutely is for the individual to control access to his own information. This factor precludes the use of central computer systems which store private medical records along with customer identification or with a derived link to customer identification. Organizations such as insurance companies are not legally bound under Federal law to maintain strict confidentiality. In fact, it is not generally known but private companies have been regularly supplying and accessing personal medical information from third party bureaus for policy approval and premium setting purposes. This has been going on without consumer awareness or strict government supervision.

Those needing access to personal medical information must not be restricted to single points of access, i.e., to central mainframe repositories of records. This can become an emotive issue as everyone has had some negative experience in dealing with the large reservations systems which are mainframe computer based (e.g., busy signals, computer out of service or slow operation). Personal medical information must be available via widely distributed access points throughout the country, or even the world. Those able to participate and most in need of this information must include, at a minimum, the community service points which operate twenty four hours per day, seven days per week. Within this category are the "first responders" in times of emergency, e.g., 911 police and fire department personnel, ambulance staff, hospital emergency staff, on-call physicians, etc. Beyond this, community networks of public libraries, schools, hospitals, physician offices, medical laboratories, etc., should be useful as "information access" points during working hours.

SUMMARY OF THE INVENTION

In general, in one aspect, the invention relates to an apparatus for storing personal medical information including a portable medium having a surface displaying a plurality of human readable characters arranged in a sequence representative of personal medical information compressed based on the occurrence frequency of the information for a patient population.

In general, in another aspect, the invention relates to a method of storing personal medical information including compressing personal medical information into a sequence of human readable characters based on the occurrence frequency of the information for a patient population, and displaying the sequence of human readable characters on a surface of a portable medium.

In general, in another aspect, the invention features a sophisticated, but low cost personal health card system. It has the advantage of offering an effective means to compile, transport and communicate personal medical history information and to make this information available at the point of care, whenever and wherever this may be.

In general, in another aspect, the invention features incorporation of structured medical data classifications of disease, disorders, surgical procedures and medications.

In general, in another aspect, the invention features a high order data compression method utilizing a probability model of structured medical information. It has the advantage of encoding all relevant personal medical history into a visible alphanumeric code which is then imprinted onto a wallet-sized card or "sticker". In order to translate this visible code back into the original medical information, the code may be dictated by human voice over a telephone directly, or indirectly through an intermediary person, to a remote PC with special software installed. A one page personal medical history may be generated in two to three seconds and then faxed back to the caller. The invention is advantageously designed for emergency use and many other types of medical encounters.

In general, in another aspect, the invention features incorporation of up to date patient demographic information, prior medical history, prior surgical history, current medications, immunizations, family history, donor information, directives, preventive screening reminders, risk factor calculations, and even an analysis of the patient's latest EKG. While it contains a considerable amount of medical information, it is not a "smart card". No special electronic readers or writers, or electronic media are needed. No access to a central mainframe repository of medical records or a complex computer network is necessary. In fact, the invention offers the advantage of employing only existing office equipment consisting of a PC with laser printer, a telephone and a fax machine.

The invention offers the advantage of quickly providing vital medical history information at reduced cost.

Other features and advantages of the invention will become apparent from the following description and claims.

BRIEF DESCRIPTION OF THE DRAWINGS

FIG. 4 is a representation of a personal medical summary according to an implementation of the invention.

FIG. 7 is a representation of structured medical classification data available for use in making a portable medical card according to an implementation of the invention.

FIG. 8 is a representation of an updatable static dictionary for systematic tabulation according to an implementation of the invention.

DESCRIPTION OF THE PREFERRED EMBODIMENTS

Figure 1:
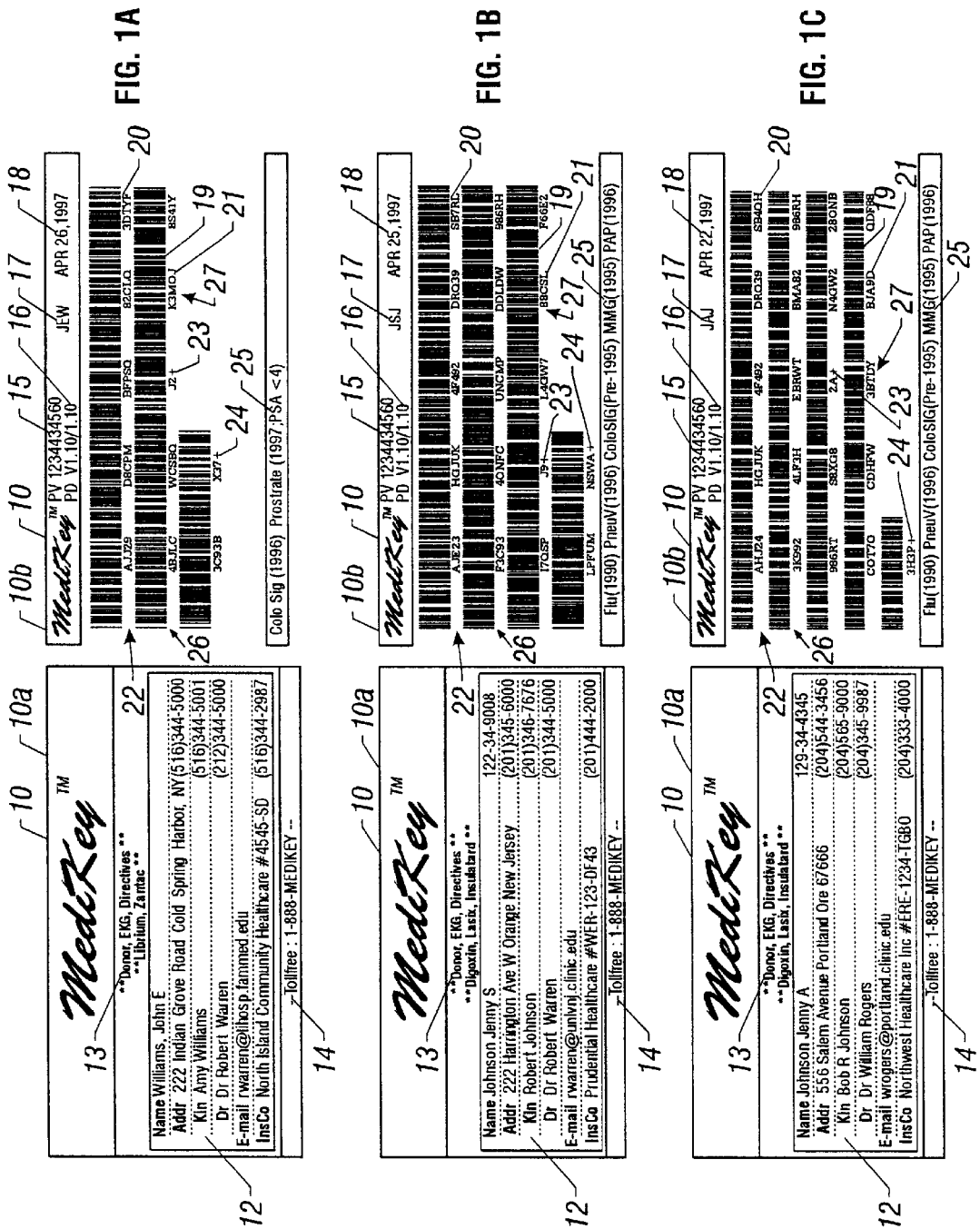
FIGS. 1(a)–1(c) are representations of front and back sides of a portable medical card according to an implementation of the invention.

An implementation of the invention, a portable medical card 10, is shown in FIG. 1(a). The card 10 is a patient-carried card having personal medical information in an encrypted alphanumeric code 20 thereon.

The card 10, may be wallet-sized and may have a front side 10a and a back side 10b. In the implementation shown in FIG. 1(a), the card 10 may include on the front side 10a a patient demographic data field 12, for example, patient name, addresses, telephone numbers, etc. The card 10 may also include a visible medical information (e.g., a warning) field 13 readable in case of emergency. An example of such a field 13 could include "Donor", "EKG", and "Directives" indicating that donor information, an analysis of an electrocardiogram, and advanced directives are encoded on the card, respectively. Also included could be card owner or holder medications or other data alerts in field 13. Field 14 may include telephone or contact information for voice translation and return communication (e.g., fax back), as described below.

The card 10 may include, on the back side 10b, for example, an identification number field 15 of the health service provider who last updated the card and a version number field 16 for the version of the information database (internal program version number and database version number) which was used to encode medical information on the card. The back side 10b may also include an initials field 17 for the initials of the card holder and a date field 18 for the last date on which the card 10 information was updated. The backside 10b further may include a code (e.g., an alphanumeric code) 20 which is organized in groups of lines 22 with five words (i.e., characters) 21 of five characters per word. The code 20 may encode emergency medical information in a section 26 bounded by a first symbol 23 (e.g., a "+" symbol), followed by (lower priority) non-emergency information in a section 27 bounded by a second symbol 24 (e.g., a "+" symbol). Sections 26 and 27 are described in more detail below. Screening and "reminders" field 25 may comprise preventive screening and reminders encoded and visible on the card 10, for example, physician-controlled (or company producing card 10-controlled) patient alert information, etc. Field 25 may further include childhood immunization "reminders" encoded and visible on the card 10, for example, physician-controlled (or company producing card lo-controlled) immunizations record and age related information. Field 25 may show a variable number of data items which are set by a medical services provider (e.g., a physician).

The card 10 may also include a barcode 19 which encodes the same information encoded in the code 20. The barcode 19 may be displayed as a variable number of lines which are stacked as shown in FIG. 1(a). The height of the barcode 19 may be custom variable depending on the amount of information needed to be encoded on card 10 (e.g., to fit up to five lines on a card) as is apparent in comparing FIGS. 1(a) and 1(b) to FIG. 1(c). Moreover, the barcode 19 may be code 39 format readable, having high density and 25 characters per line.

When the card 10 is made, the front 10a and back 10b may be printed separately (e.g., using 300 dpi laser printing on the card material comprising card 10 or on a sticker to be affixed to the card material). The back 10b may be a sticker update which can be affixed to a plastic insurance card or a driver's license. Updated stickers may be affixed to prior stickers. Plastic may also be applied over the barcode 19 for durability of card 10.

The properties of card 10 may include the following. The code 20 on card 10 may be human readable alphanumeric characters using a convenient 32 symbols as described below. The code 20 may be translatable over telephone for emergency services. The code 20 may include the capability for error detection, for example, it may allow detection of reversal of characters when the code 20 is read over a telephone to a central office for translation by a PC. The code 20 may be error corrected, for example, to eliminate ambiguous symbols. The card 10 (and code 20) may be designed for voice response equipment reliability, it may provide password protected access for privacy/confidentiality, and it may be designed for efficient transmission of code via tone generating devices.

The functionality to translate and update the personal medical information on the card 10 does not require special electronic read/write equipment, or the use of central computer repositories of medical records or complex computer networks. Computer software is all that is required to access the patient's medical information from the alphanumeric code 20.

Figure 2:
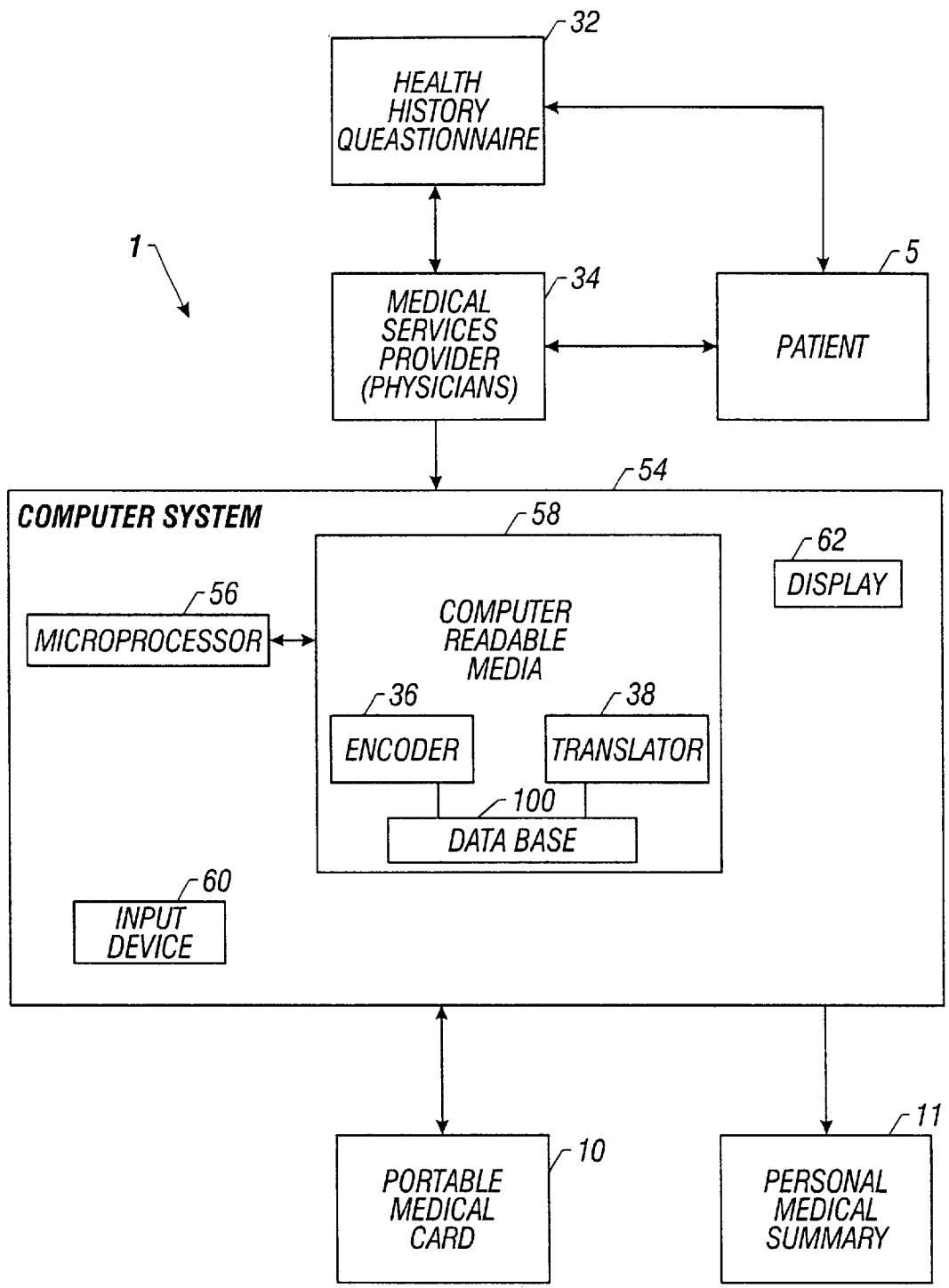
FIG. 2 is a representation of a system for storing and retrieving personal medical information according to an implementation of the invention.
Figure 3:
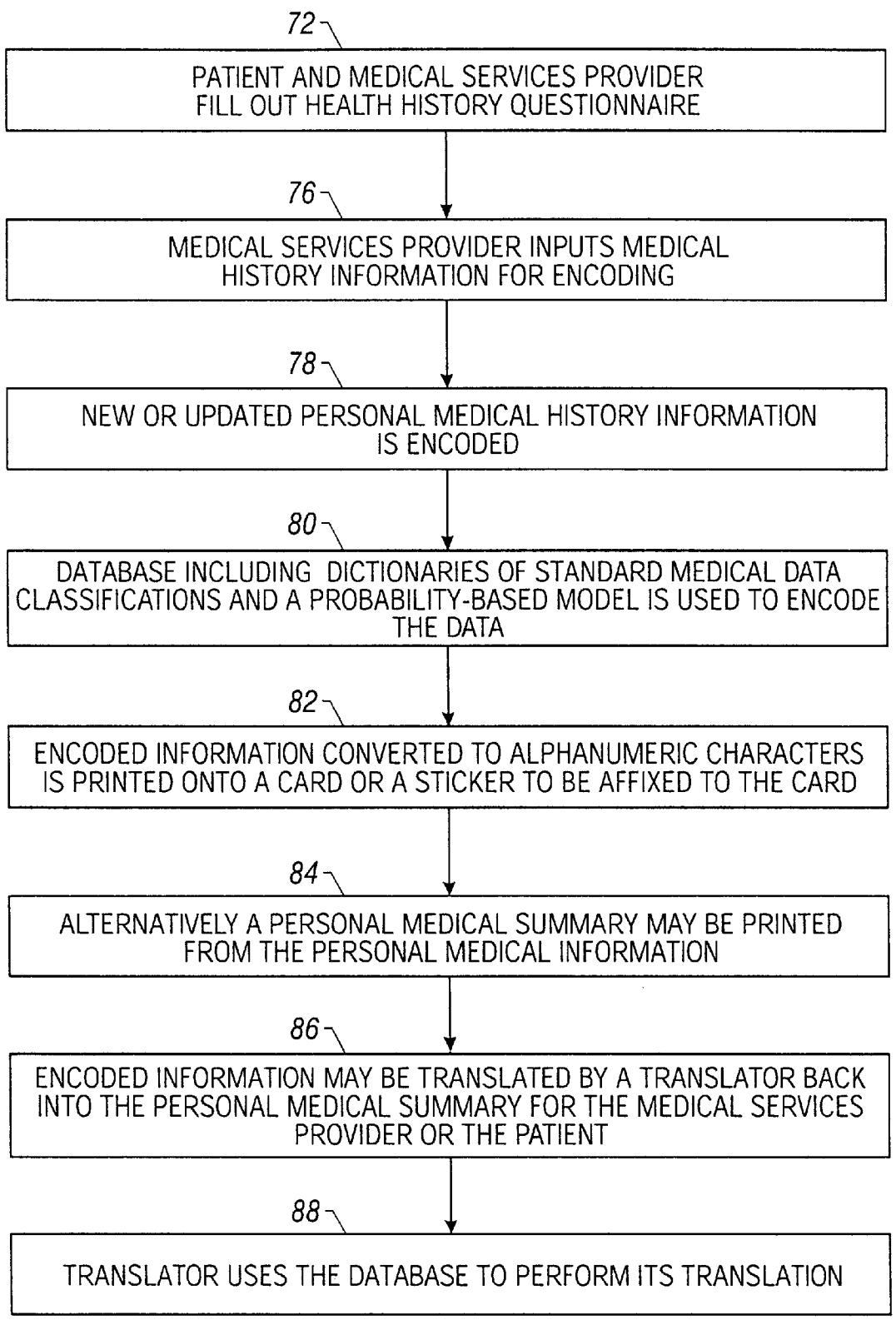
FIG. 3 is a representation of a method according to an implementation of the invention.

FIG. 2 is a representation of a system 1 for storing and retrieving personal medical information and FIG. 3 is a representation of a method for storing the personal medical information according to an implementation of the invention according to implementation of the invention. A medical services provider 34 (e.g., a physician) provides a patient 5 with a Health History Questionnaire 32 which may be filled out 72 by the patient. The medical services provider 34 then completes the questionnaire 32, and this information along with any other additional information (e.g., from external databases is then inputted to a computer system (e.g., a PC) 54 through an input device 60 (e.g., a keyboard and/or mouse). A display 62 may be provided (e.g., a monitor) so that the medical services provider 34 may view 76 what is being input and as an aid in making selections within an encoder program 36. PC 54 may be Windows based for the encoder 36. The encoder program 36 which is stored in computer-readable media 58 (e.g., a memory) sends instructions to control a microprocessor 56 to encode 78 new or updated personal medical information (for the card 10) as will be discussed in detail below. A database 100 (discussed below) including dictionaries of standard medical data classifications and a probability-based model stored in media 58 is used 80 by the encoder 36 to encode the data. The computer system is configured (e.g., with a laser printer (not shown)) to print 82 (store) the encoded code 20 information onto the card 10 or a sticker to be affixed to the card 10. In certain other implementations of the invention, a magnetic stripe card or a microprocessor-based smart card may be used for magnetic encoding or digital encoding of the data. Alternatively, a personal medical summary 11 (see FIG. 4) may be printed 84 from the personal medical information.

The translator program 38 which is stored in media 38 may be used to send instructions to the microprocessor 56 to translate 86 the code 20 information back into the personal medical summary 11 which may be provided to the medical services provider 34 or the patient 5. The translator 38 also uses the database 100 to perform its translation 88. The encoder 36 and the translator 38 may not be physically located in the same computer system in other implementations of the invention. Moreover, more than one medical services provider 34, even at different locations, may be involved in the process of encoding and/or translating. PC 54 could be a DOS-level PC which may suffice for the translator 38, although a Windows-based PC 54 could be used.

Figure 5:
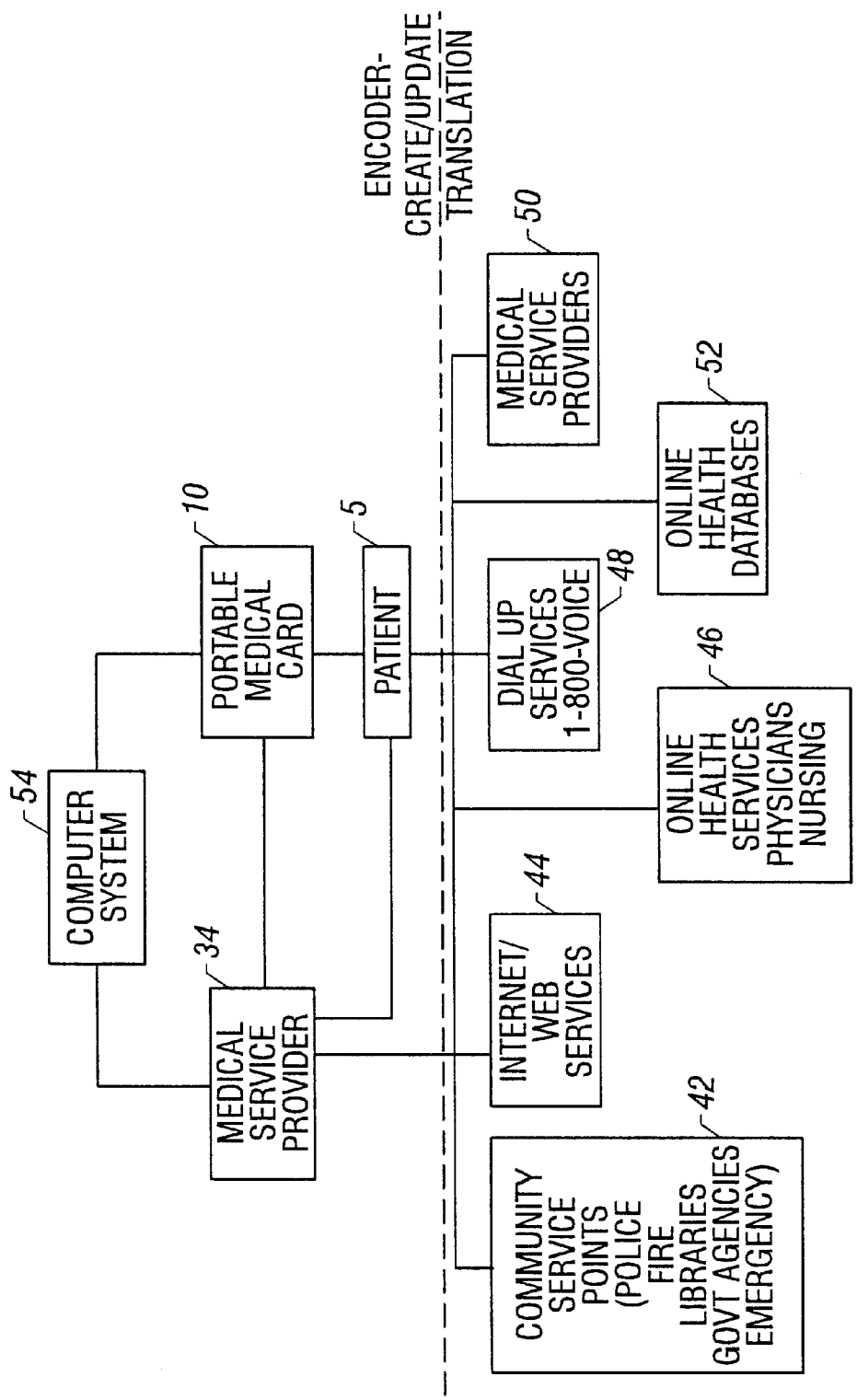
FIG. 5 is a representation of a system for storing personal medical information on a portable medical card and for accessing the stored information from several service providers according to an implementation of the invention.

Such database 100, encoder 36, and translator 38 software is designed to reside on any number of distributed PCs which may be like PC 54. For example, as illustrated in FIG. 5, the software may reside in PC's 42 installed in libraries, police departments, emergency rooms, physicians offices, clinics and government offices for translation. The software is designed to be accessible remotely via PC connection to the Internet and the World Wide Web 44 for card update and translation. Remote telephone translation and faxback services are also available remotely via a tollfree number dial up services 48. Simple reading of the alphanumeric code 20 over a telephone line to a person with access to the software will enable retrieval of the medical information from the card. Services may also be available from other medical service providers 50, on-line health databases 52, or on-line health services 46 with interfaces to translate the card code.

Figure 6:
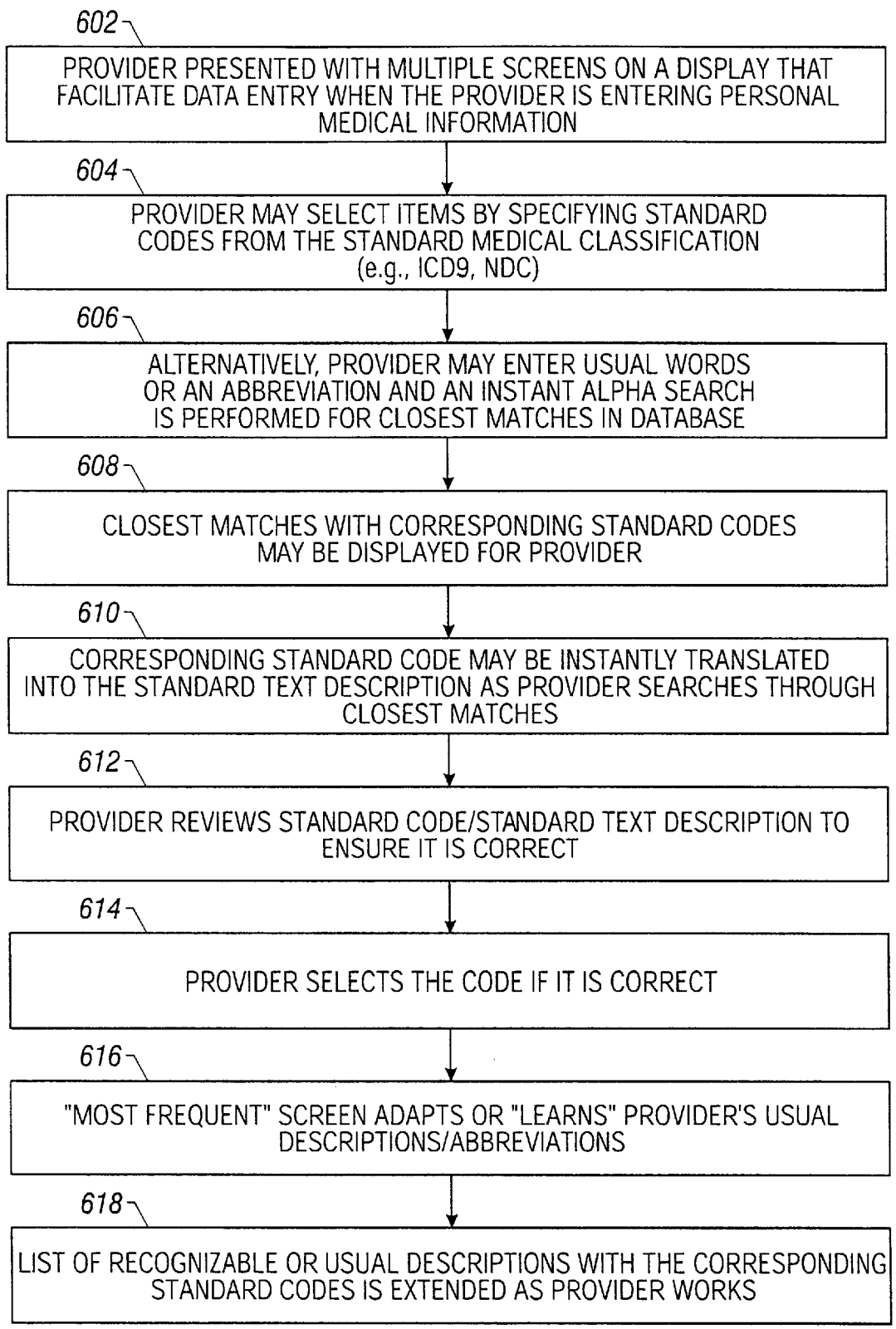
FIG. 6 is a representation of a method according to an implementation of the invention.

FIG. 6 is a representation of a method according to an implementation of the invention. The medical services provider 34 (e.g., a physician or person authorized by a physician) is employed beneficially in the use of system 1 (FIG. 2). When the provider 34 is entering the personal medical information of the patient 5, the encoder program 36 presents 602 the provider 34 with multiple screens on display 62 that facilitate data entry. The provider is, thereby, used in the preparation of the data input stream to be compressed. The provider 34 sees standardized codes and descriptions on the display 62 (e.g., like the ICD9-CM and NDC codes described below) from which he or she selects 604 items with input device 60 that describe the diagnoses, procedures, and medications, if any, for patient 5. The provider has usual words/abbreviations that he or she may use. For example, the provider may type "TE" for tension headache. The encoder 36 performs 606 an instant alpha search while the provider 34 is inputting the data to search for the closest match on the database 112 (described below) in database 100. The computer 54 may display 608 a description, for example, "Tension Headache" along with its code 106 "307.81" (described below) on display 62. There is an instant translation 610 of the code into full text (e.g., ICD9 code) on the display. The provider reviews 612 the code to ensure it is correct, and selects 614 the code (e.g., by selecting "OK" on the screen 62) if it is correct. If a diagnosis (or other data) is not displayed (e.g., in a "Most Frequent" screen), then the provider may request 616 a search (e.g., by pressing "search" on the screen). As the provider 34 works, the encoder 36 adapts or "learns" 618 by extending its list of recognizable items. For example, the encoder 36 learns the usual words/abbreviations that the provider 34 uses and associates them with the correct codes based on previous selections. With such a system, the provider 34 is limited to those standard medical data classifications included in the dictionary 112.

There is a primary static dictionary at source and a secondary static dictionary at the receiver. The primary and secondary dictionaries are always synchronized with respect to data content. The dictionary at source may require additional sequencing information which is not required at the receiving end. Implementations of the invention are based on multiple, sets of updatable static dictionaries. The subject dictionaries are updatable using several techniques not mentioned in other methods as will be discussed below.

A static dictionary is prepared beforehand and its content is not dependent or modifiable in "realtime" based on the input data stream to be compressed. The static dictionary also contains a body of pointers or offsets which are associated with and point to the individual data items in the dictionary. These pointer items are normally fixed in size where the length in number of digits is related to the total number of entries within the static dictionary.

In alternative "free" text compression techniques, the input data stream to be compressed is usually in the form of one or more documents composed of "free" text language. These documents must be processed in their entirety by supplied parsing programs. Parsing techniques identify special characters, word and phrase boundaries. Word and phrase combinations so identified are then searched for in the static dictionary for a match. If a word or phrase combination in the input stream has been matched it may then be replaced by its associated pointer or offset within the static dictionary. The resulting sequence of pointers forms the output data stream which may then be transmitted to the receiver or simply written in "encoded" form to an external storage medium. If residual items in the input data stream are not matched, then they can be entered into the output stream as uncompressed items.

In alternative "free" text techniques, the compression efficiency may be reduced substantially based on the number of unrecognized items in the input stream. The subject application requires a "lossless" compression scheme where nothing is lost from the original input data stream. This first stage of data compression is known as "systematic tabulation" and is common to all techniques.

Implementations of the invention use data compression of whole data items within standard structured medical classifications (described below) versus the traditional encoding of "free" text words and phrases. Higher compression ratios may be achieved by reducing both the individual length and number of items required in the output data stream. This will reduce the number of characters of data which are eventually written to the external card 10 medium.

Consider the case of the structured whole data items below which are typical of medical diagnoses in a structured medical data classification.

A. Hypertensive Heart Disease with Renal Disease with Congestive Heart Failure
B. Chronic Obstructive Asthma with Pulmonary Disease without Status Asthmaticus
C. Diabetes Mellitus with Renal Complications of non-Insulin Dependent type
D. Nephritis, Nephropathy not specified as acute or chronic Encoding whole data items of such a list of medical diagnoses may be more efficient than encoding individual words or phrases. This is because there are more individual words and phrases than there are whole data items and each new data item introduces at least one new word or phrase. If one were encoding the individual words or word sequences above, then many more dictionary entries would be required than just four. While encoding individual words/phrases may require a smaller static dictionary because some words, e.g., "with", are repeated several times, the actual compression ratio achieved is more important than the size of dictionary storage. The encoding of whole data items is not practical in "free" text systems. This is because the physician supplies the "free" text word sequences in documents to be compressed and because each physician's terminology is different. If all the possible combinations of "free" text words and phrases in physician's medical histories had to be accounted for, then this would require a very large dictionary composed of an excessive number of data items. This would increase the length of the pointers or offsets stored within the output data stream, thereby reducing compression efficiency. Using very large static dictionaries could also require an excessive amount of time (minutes) during the search and match stage of compression and this would not be suitable.

Therefore, implementations of the invention utilize multiple static dictionaries which incorporate standard, structured medical classifications. Among these are standard classifications of disease and disorders, surgical procedures and medications. The advantages are that the multiple static dictionaries employed can be easily updated from year to year, the format and content of the information is consistent from data item to data item, the internal coding system for each of the medical classifications is standardized, and finally the nomenclature is recognized by physicians and others within the healthcare industry. "Free" text dictionaries are not suitable for the proposed portable medical card 10 invention.

Utilizing structured data and whole data items improves the data compression substantially since there are standard descriptions for diseases, disorders, surgical procedures and medications. This results in fewer dictionary entries and smaller dictionaries compared to "free" text systems. It can be shown that the output data stream will consist of short individual codes, and that the amount of time required (seconds) to perform the compression and decompression stage is reduced. Implementations of the invention also use systematic tabulation which was described earlier. Systematic tabulation may be contrasted with compression as follows.

In implementations of the invention, a second level of static dictionaries 122 (described below in more detail) has been organized to hold high probability data items and combinations of data items utilizing a ranking scheme based upon a "figure of merits" (FOM). Individual entries are ranked by FOM which takes into account frequency and number of items tupled (multiple items which: can occur together in an input stream). For example, FOM ranking may be by the product of frequency x number of tuples. Items may be tupled as pairs (2-tuple), threes (3-tuple), fours (4-tuple), etc. Up to 4-tuple combinations, for example, may be included to get improved compression results. To those skilled in the art, this is referred to as data compression of multiple-items-at-a-time, where frequency or probability information is known of the combinations of data items which can occur together in the input stream. The items consist of independent and identically distributed items. The input stream data items are also organized in such a way where order does not matter and the items don't repeat. Based upon the higher order compression achieved and the properties of the data items in the input stream, it can be shown that compression well below the Shannon bound is possible. A specific example of the above scheme will be provided below.

After compression using the frequency-tuples information, implementations of the invention use a vocabulary of output code symbols to represent groups of bits to further compress information. A two symbol vocabulary of ones and zeros would not be suitable. A larger vocabulary has, therefore, been chosen. This reduces the space required for what otherwise would be a binary string. In theory, any binary string no matter how long can be reduced to one symbol if the alphabet chosen is complex enough. Implementations of the invention are based upon a vocabulary of, for example, 32 symbols each of which is represented by a five bit value and where all configurations of bits are utilized for optimal efficiency. A 32 symbol alphabet may consist, for example, of the ten numerals and twenty-six uppercase letters minus four symbols for error detection and correction (e.g., numerals zero, one, five and the letter Z). Using a larger alphabet may pose communications problems because it may be desirable or necessary (e.g., in an emergency) for the symbols to be human readable from the card 10 and it is desirable that they be reliably processed by voice response equipment for decoding and retrieval of the medical information content. A larger alphabet may achieve a smaller overall code size, but then the choice of symbols would increase in complexity, thereby potentially introducing more human error in communication of the compressed code.

Implementations of the invention use a static dictionary technique composed of structured data items and an encoding technique which may eliminate the possibility of "unrecognized" data items. The implementations of the invention may, for example, incorporate, as briefly mentioned above, standard medical classifications, a sample of which is shown in FIG. 7, of disease and disorder, surgical procedures, and medications, for example, the ICD9-CM—the International Classification of Disease and Disorders published by the U.S. Department of Health and Human Services, the CPT4 classification of surgical procedures (optional), published by the American Medical Association, and the National Drug Catalog of prescribed medications published by the U.S. Food and Drug Administration (FDA). By utilizing such standard medical data classification, the input data stream is limited to known recognizable data items.

The properties of such data classifications relative to coding structure, language and vocabulary are known. The ability to flexibly update the database 100 (which comprises dictionaries 112 and 122), when required, is available as will be discussed below. New releases of medical data classifications are distributed each year. The coding scheme established for each medical classification enables additions and deletions to be incorporated easily into the database 100.

Along with the availability of an updatable database 100, a key consideration is that the data integrity of the medical card 10 already produced must be maintained over time. This means that the compressed codes 20 created by previous or older versions of the database 100 are decompressable, even when a different (i.e., newer) database 100 is used. An example of how older versions of the medical card 10 are handled is given below.

Backward compatibility may be provided by implementation of the invention as follows. Referring to FIG. 8, the structured data items 102 in the database 100 (dictionary 100) are organized in a record by record sequence and the records 104 include unique keyed fields 106. For the process of encoding, a unique keyed field is desirable. With the key 106, any database record 104 may be searched for and found reliably. An example of a key (code) 106 would be the ICD9 code for Essential Hypertension, "401.9". There are approximately 14,000 of these ICD9 codes to describe each of the diseases and disorders in the ICD9 classification. A second key 114b "Recid" (used in decoding) is used to maintain the order of all records 104 in the database 100 over time. When an ICD9 code, e.g., 401.9, is encoded from the static dictionary 112, this code with its text description is recreated from the database 100 at decompression (translation) time. So, as long as old codes are not deleted and the Recid field 114b is not changed, the decompression should be successful.

New codes 106 or additions are always assigned unique Recid fields and are appended to the last entered code 106 and as such do not disturb the existing scheme. When existing codes 106 are changed in some way, for example, a change in description of a disease or disorder, the encoder 36 sends instructions to microprocessor to "extend" the database 100 (dictionary 112) by creating a new version of the changed record and linking the old record to the new record 104. Moreover, when a record 104 is deleted from the ICD9 classification, it is not physically deleted from the dictionary 112. An indicator 110, for example, the next pointer is set to a 2's complement value so that the record is not used for new cards 10. As a result of these processes, the data integrity of the database 100 is maintained.

Implementations of the invention are designed such that new cards 10 may be partially if not fully decompressed using old databases 100. This is important because old and new copies of the cards 10 may exist in the field and it is, therefore, desirable to maintain "forward" and "backward" compatibility of cards 10 and systems 1, especially if medical records are needed in case of emergency.

Implementations of the invention include the multiple level static dictionaries 100 (i.e., dictionaries 112 and 122) which are prepared in advance. Structured data sections 102 of the dictionaries 112 include diagnoses (Dx) 112a, procedures (Px) 112b, and medications (Rx) 112c. Using the structured data 102, for example, medical classifications, ICD9 diagnoses, ICD9 procedures (and optionally the CPT4 classification), and the drugs directory from the National Drug Catalog, multiple static dictionaries 100 are created. The code 103 values for ICD9 diagnoses 112 a consist of three characters, a decimal point followed by an optional fourth and fifth digit (see FIGS. 7 and 8). Each of the codes 103 is unique. The description for each of the diagnosis codes 103 is maintained by international authorities. The coding classification is updated annually, where codes are deleted, new ones are added and others are changed textually. The ICD9 procedures 112b classification is identical in concept except that the procedures codes 103 have a different format. The format is two digits, a decimal point and then optionally one or two more digits. The medications dictionary 112c, for example, from the National Drug Catalog, has medication codes 103 for a listing of more than ten thousand medications, generic and trade names, available strengths, routing and form information. FIG. 8 shows the updatable static dictionaries 112 used for systematic tabulation.

Figure 9:
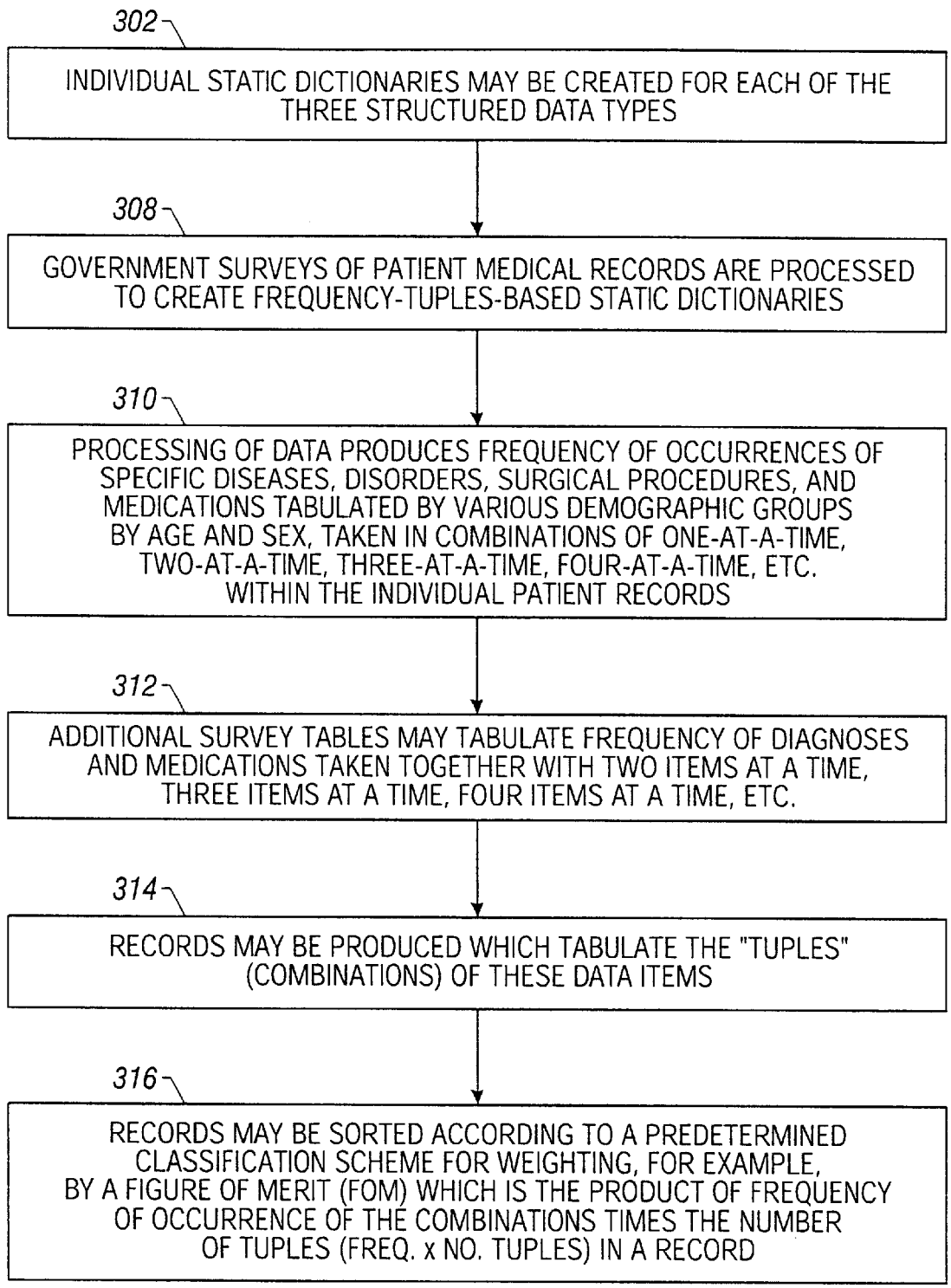
FIG. 9 is a representation of a method according to an implementation of the invention.

FIG. 9 is a representation of a method according to an implementation of the invention.

The individual static dictionary 112 may be created 302 for each of the three structured data types, Dx 112a, Px 112b, and the Rx 112c. Three fields may be added to the individual codes records 104 for dictionary "Version" number 114a, "Recid" (record ID) pointer 114b, and a "Next" pointer field 114c. The Version field 114a may be a numeric value used to identify the current release (or generation) of the database 100.

The Recid pointer field 114b may contain unique sequential values incorporated within each record 104 in the dictionary 112. In the case of the ICD9 diagnoses used for Dx 112a, the values range from 1 to approx 14,500. The Next pointer 114c contains a pointer to a replacement for an older record 104, if any. Replacements will normally be appended to the end of a given dictionary 112 using the next unused Recid pointer value 114b. So, a first new record added to the diagnosis dictionary 112a will have Recid= 14501, as indicated in FIG. 8. In FIG. 8, the record with code: "550.01 Recurrent.." is an added new record 104. The second addition, code "003.2 Localized.." is a replacement record 104 for an earlier record 104. The earlier record 104 therefore, has a Next pointer 114c of "14,502.". No records 104 are ever physically deleted from the file. Instead, they are flagged with a delete indicator (not shown), and/or its Next pointer 114c is updated as discussed. This feature ensures data integrity, because medical cards 10 issued with older dictionaries 112 may require old diagnoses (or other) codes 103 (or 106). Using the described technique, old cards 10 will be translatable using newer dictionaries 112 as discussed. New codes 103 (or 106) are assigned using the last record in the "Next" 114c chain. So, if a new card 10 calls for a diagnosis code "003.2", the second (latest) record 104 for this code 103 will be used.

The procedures Px dictionary 112b may be structured analogously to the diagnoses dictionary 112a. However, the medications dictionary 112c may include additional subsidiary information 114d (e.g., usual strength 118 and frequency 120 information) about the drug. Additional information 114d may be incorporated into the medications dictionary 112c records than what is contained in the National Drug Directory. That is why the usual strengths 118 and usual dosage frequencies 120 are shown to be added in FIG. 8. This additional information 114d on strengths and dosage is included within the dictionary 112c so it may be included on the medical summary 11 and/or card 10. The same concept of Version number 114a, Recid pointer 114b, and Next pointer 114c applies to the Rx dictionary 112c.

Referring back to FIG. 8, systematic tabulation is the process whereby data items in an input stream may be replaced. For example, the input data items, i.e., diagnoses, surgical procedures, and medications, may be replaced by corresponding dictionary Recid pointers 114b for Dx, Px, and Rx data types in the static dictionaries 112a, 112b and 112c, respectively. These pointers may be converted and set to their binary-equivalent number where the size (i.e., the number of bits) is fixed to a predetermined (e.g., minimum) length in order to address or accommodate each of the items in the specific static dictionary (i.e., 112a, 112b, or 112c).

For example, a 14-bit equivalent pointer (i.e., equivalent to Recid 114*b* ordinal number entries) may be required to address each of the 14,500 ICD9 diagnoses codes (in Dx 112*a*). Since 14 bits will address up to 16,384 items, the method has reserve for growth and changes. In analogous fashion, the procedure pointers 114*b* (in Px 112*b*) may be set at 12 bits because the ICD9 Procedures classification contains 3,500 codes. Moreover, the medications pointers 114*b* may be analogously set at 13 bits which will address up to 8,192 selected medications, enough, for example, to cover the National Drug Catalog.

Subsidiary information is data item-dependent. Physicians may encode the subsidiary information (for Dx, Px, and Rx) when encoding the personal medical information with the encoder 36. Subsidiary diagnosis information comprises, for example, an acute or chronic condition, when an acute condition last occurred if during last three years, or if earlier, the age band (range) of the patient when the last incident occurred, etc. One bit is required to indicate an acute or chronic condition, one bit for age type, two bits to indicate a yearly aging for four years or three bits to provide an age band indicator for eight age bands. The format of the subsidiary information field is provided below.

| Subsidiary information field - Dx/Px "S" 114e | | |
|---|---|---|
| Acute/chronic flag | 1 bit | |
| Acute aging type | 1 bit | Yearly or age banding |
| Yearly | 2 bits | 4 years indicated (97, 96, 95, pre95) |
| Age banding | 3 bits | 8 age bands indicated |

As discussed above, for medications, the Recid 114*b* may be thirteen bits, the subsidiary information may be one acute/longterm bit, and there may be from zero to four bits for a strength item 118 which is carried in each of the Rx static dictionary record 106 of the record 104, followed by a fixed/variable bit for frequency 120, followed by a fixed four-bit frequency contained in a fixed table or a variable one to three bit frequency which is carried in each of the Rx static dictionary record 104. The number of strength or frequency elements (entries or items) in each of the Rx static dictionary records 104 dictates the size of the bitstring to encode/decode. So if there is only one strength 118 in each record 106 of the Rx static dictionary records 104, then only one bit is required to hold this item. If there are nine items in the static dictionary records 104, then four bits are required to hold the items. A summary of the foregoing medication description is provided below.

| Subsidiary information field - medications "S" 114f | |
|---|---|
| Acute/longterm | 1 bit |
| Variable strength | 0–4 bits based on number dictionary record items |
| Freq: fixed/variable | 1 bi Frequency items in fixed table or dictionary record |
| Fixed table | 4 bits Sixteen entries in fixed table |
| Variable table | 1–3 bits up to eight frequencies in dictionary |

A similar procedure may be followed for the procedure pointers 114*b* in Px 112*b*.

Figure 10:
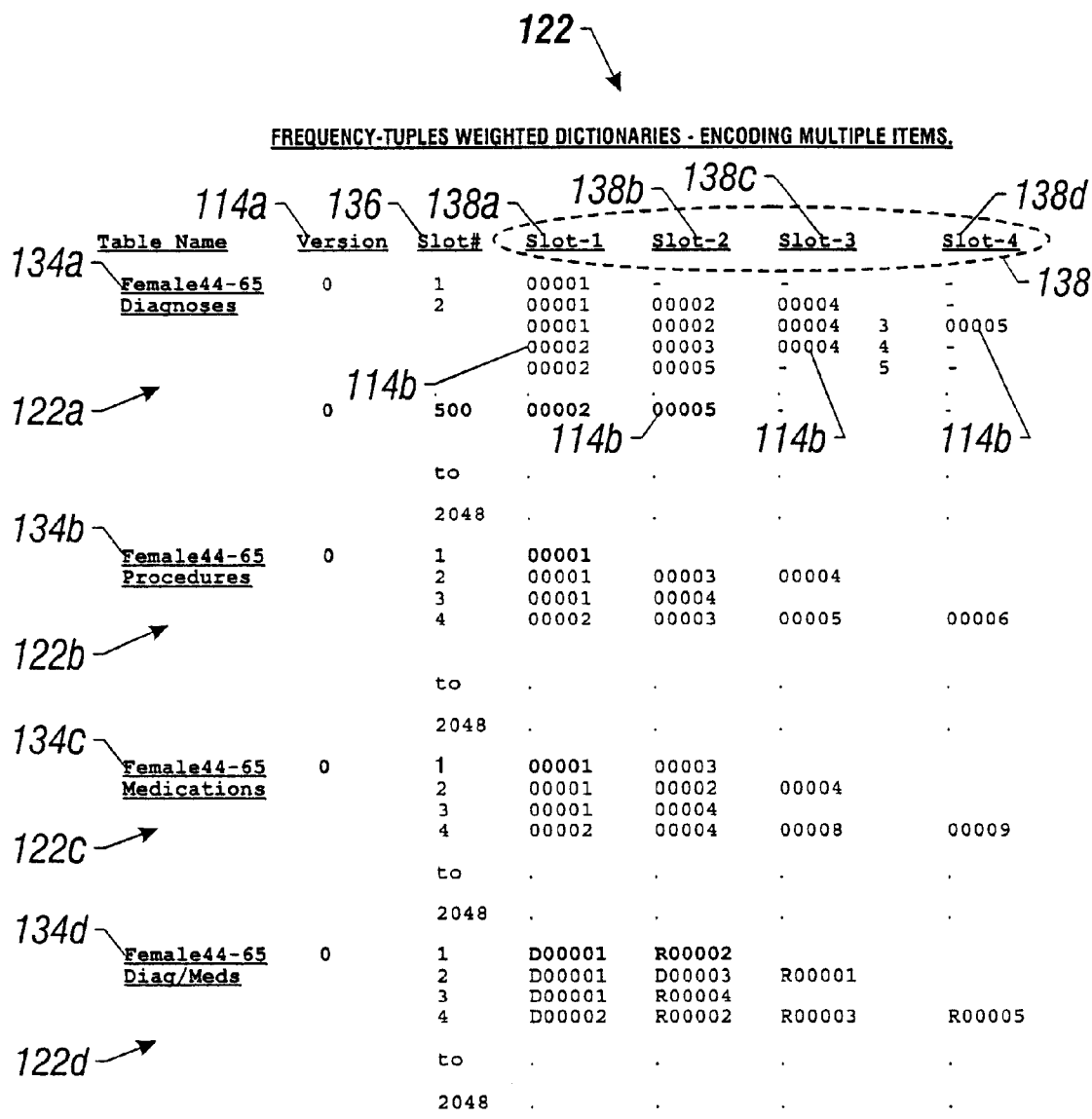
FIG. 10 is a representation of a frequency-tuple weighted static dictionary according to an implementation of the invention.

Reference is made to FIG. 10 which highlights part of a the dictionary 122 used for compression in implementations of the invention. Compression may be improved for medical information in the medical card 10 or for storage on the computer readable medium by taking into account the frequency of occurrence of diseases, disorders, surgical procedures, and medications within the general population in addition to the systematic tabulation dictionary 112 as discussed above. In order to do this, government surveys of patient medical records are processed to create 308, (see FIG. 9) the frequency-tuples-based static dictionaries 122 for Dx 122*a*, Px 122*b*, Rx 122*c* and Dx/Rx 122*d* (See FIG. 10). Such surveys have been conducted for the last twenty years and have produced hundreds of thousands of patient records which are used to produce the combination of diagnoses 122*a*, procedures 122*b* and medications 122*c* occurring or used during hospital inpatient and ambulatory outpatient encounters. The survey data that may be used include, for example, those data which are published, for example, by the U.S. Department of Health and Human Services, incorporated herein by reference to the extent necessary:

1. National Hospital Discharge Survey (NHDS 1990)
2. National Ambulatory Medical Care Survey (NAMC 1990, 91,92, 93)
3. National Hospital Ambulatory Medical Care (NHAMC 1992)
4. Longitudinal Study of Aging (LSOA 1984–1990)

Implementations of the invention may use such surveys which incorporate statistical methods of sampling and provide weightings necessary to extrapolate frequency of occurrence of those diseases, disorders, etc. that correspond to the entries in the static dictionaries 112*a*, 112*b*, and 112*c* over the U.S. population. Similar surveys obtained from any given population worldwide could be used for other implementations of the invention. A feedback procedure may be provided which periodically updates the frequency-tuples dictionaries 122 to improve compression results. For example, patient records generated by existing users could be monitored on a monthly basis in order to modify or update the existing frequency-tuples dictionaries 122. The processing of these data may, for example, produce the frequency of occurrence of specific diseases, disorders, surgical procedures and medications tabulated 310, (see FIG. 9) by six various demographic groups by age and sex, taken in any combinations of one at a time, two at a time, three at a time, and four at a time, etc. within the individual patient records. Data types, diagnoses, procedures and medications may be tabulated separately or in any combination. Additional survey tables may tabulate 312 frequency of diagnoses and medications taken together similarly with two items at a time, three items at a time, four items at a time, etc.

These records, for example, hundreds of thousands of them, may be produced which tabulate 314 the "tuples" (combinations) of these data items. These records may be sorted 316 according to a predetermined classification scheme for weighting, for example, by a figure of merit (FOM) which is the product of frequency of occurrence of the combinations times the number of tuples (freq.×no. tuples) in a record. A predetermined top number of records, for example, 2048 having the highest figures of merit in order from high to low may comprise the individual tables. The tuples weighting in the FOM is incorporated because it populates the 2048 record tables with more high tuple combinations of diseases, etc. This will enable implementation of the invention to compress higher multiples of data items frequently occurring in patients and improve data compression.

Static dictionaries 122, for example, twenty-four of them, may be produced from these surveys, organized as follows, and utilized for "frequency-tuples-based" compression (described below):

| Demographic Group | Dx | Px | Rx | Dx/Rx |
|---|---|---|---|---|
| Under 15: | Diagnoses, | Procedures, | Medications, | Diag/Meds combinations |
| Male15–44: | Diagnoses, | Procedures, | Medications, | Diag/Meds combinations |
| Female15–44: | Diagnoses, | Procedures, | Medications, | Diag/Meds combinations |
| Male44–65: | Diagnoses, | Procedures, | Medications, | Diag/Meds combinations |
| Female44–65: | Diagnoses, | Procedures, | Medications, | Diag/Meds combinations |
| 65 Over: | Diagnoses, | Procedures, | Medications, | Diag/Meds combinations |

FIG. 10 shows a layout of a representative sample of these dictionaries 122 for the Female 44–65 demographic group.

New versions 114a of dictionary 122 may be made by updating based on a need to update. For example, different countries may require an update to be made if an original version was made in another country because of a difference in the frequency of occurrence of specific diseases, etc. in the local population. Also, if the frequency of certain diseases changes over time, the dictionary 122 may be updated.

As an example of an implementation of the invention, let us assume there is a white female patient who is 56 years old. The patient has three diagnoses in her past medical history which are to be encoded on a medical card 10 or for storage in the computer-readable medium 58. Analogous procedures apply for the procedures and medications data types. These analogous procedures would be apparent from the present example. The diagnoses codes with subsidiary information bits are as follows:

| Example - Three Dx items plus subsidiary information ||||||
|---|---|---|---|---|---|
| Dx | Recid | Acute/chronic | Yearly/ageband | Age <=4 yrs | Age band |
| 003.0 | 00002 | Chronic | — | — | — |
| Value |  | 0 | — | — | — |
| 537.1 | 00005 | Acute | Yearly | 1996 | — |
| Value |  | 1 | 0 | 01 | — |
| 550.01 | 14501 | Acute | AgeBand | — | Age44–65 |
| Value |  | 1 | 1 | — | 110 |

Diagnosis (112a) 003.0 (i.e., an example of code 103 (106)) is a chronic permanent condition, i.e., and includes subsidiary information 114e. Diagnosis 003.0 is Recid "2" (i.e., example of 114b) in the dictionary 112a. The subsidiary information 114e is entered by the provider 34 at the time of encoding with the encoder 36. Aging may not be included for chronic conditions. Similarly, 537.1 (Recid "5")is an acute condition which last occurred in 1996. There are four yearly categories which are encoded in two bits, for example, "1997(00), 1996(01), 1995(10), pre1995(11)". Year 1996 is the second item and is, therefore, coded as bitstring "01". Again, similarly, 550.01(Recid "14501") is an acute condition which occurred when the patient was 56 yrs old. There are, for example, eight age bands from Under-5 to Over-65. Age 56 may be in the sixth age band of the series of ranges (Ages 44–65), expressed as the binary-equivalent bitstring "110".

The bitstring for each item may be as follows:

| Recid (Dx is 14 bit) | Acute/chronic | Yearly/ageband | Age <=4 yrs | Age band |
|---|---|---|---|---|
| 00 0000 0000 0010 | 0 | — | — | — |
| 00 0000 0000 0101 | 1 | 0 | 01 | — |
| 11 1000 1010 0101 | 1 | 1 | — | 110 |

Figure 11A:
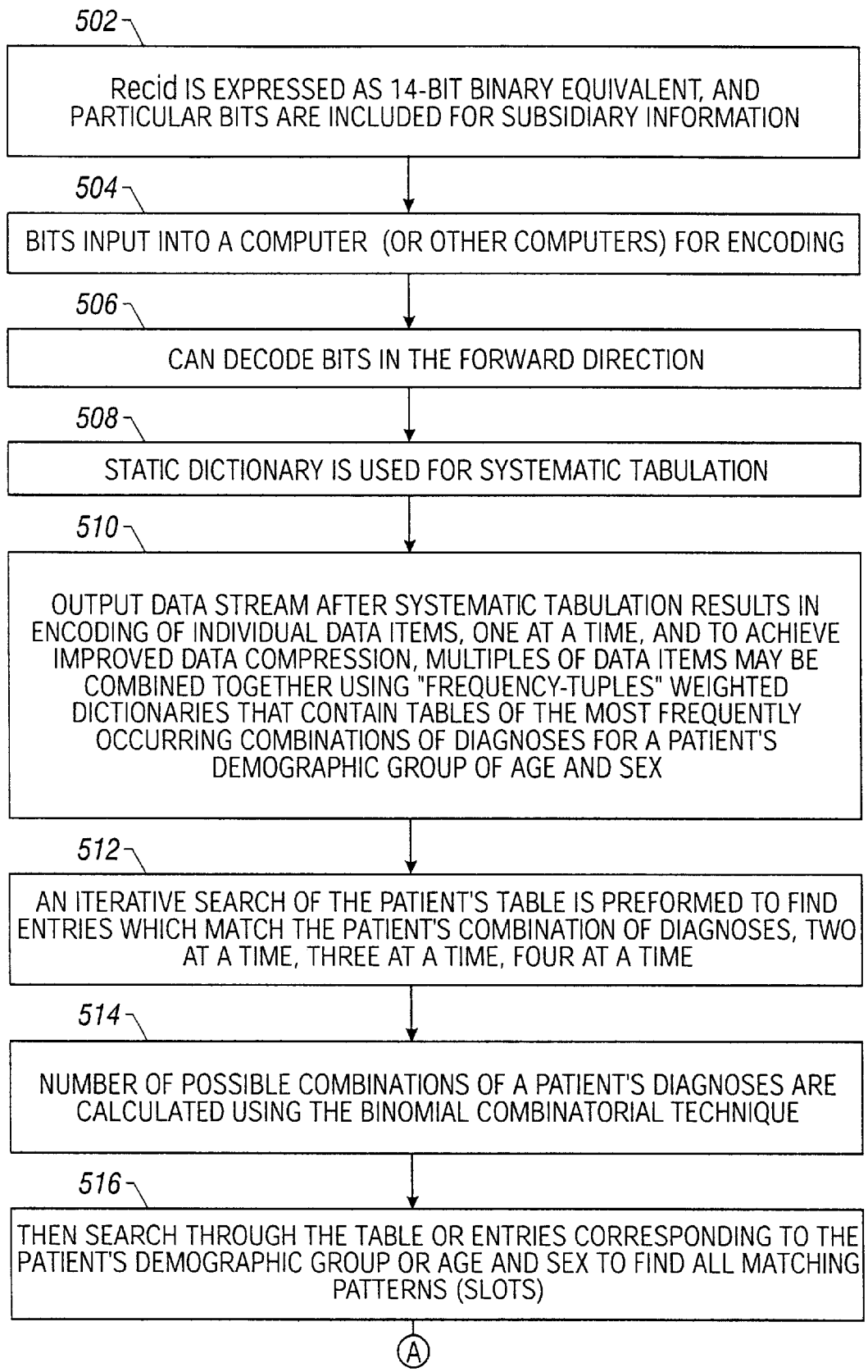
FIGS. 11A and 11B represent a method according to an implementation of the invention.
Figure 11B:
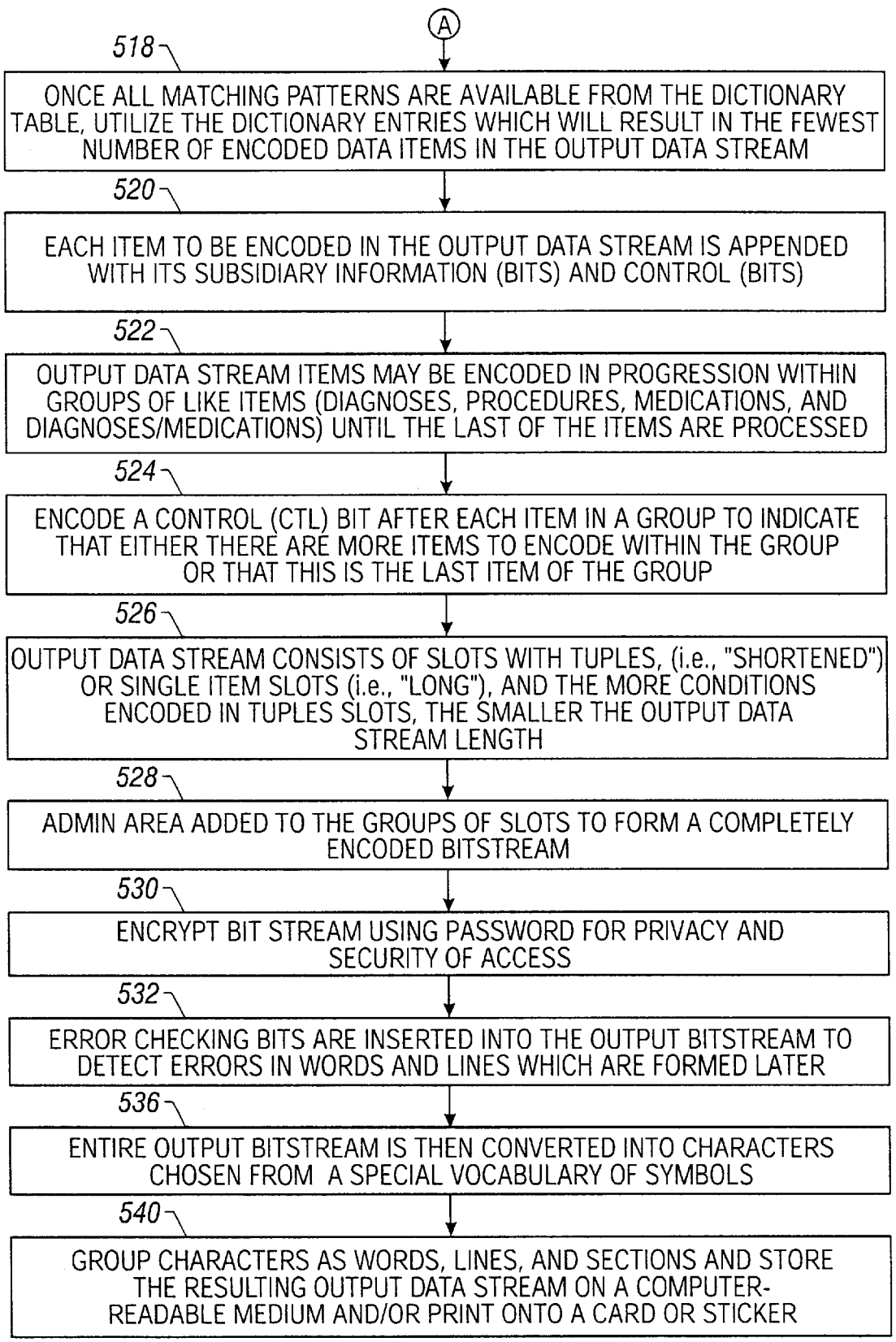

FIGS. 11A and 11B are a representation of a method according to an implementation of the invention. In this example, Recid (114b) "2" is expressed 502 as its 14-bit binary equivalent as discussed, and particular bits are included for the subsidiary information 114e in the other columns. The output consists of the above bitstring values strung together in sequence across a given row. For example, the first Dx consists of 14+1=15 bits, the second consists of 14+4=18 bits, and the third consists of 14+5=19 bits. When these bits are input into computer 54 (or other computers) for encoding 504, they can be decoded 506 in the forward direction as follows. The Recid for a diagnosis is 14 bits, followed by one bit for acute/chronic, then if acute, the one bit for yearly/ageband, followed by two bits if yearly aging, or three bits if age-banded.

For handling of the procedures (Px 112b) (the procedures are the procedures Recids 114b), the above process is similar, but may instead use twelve bits, as discussed above. The handling of the subsidiary information 114e bits may be similar. For medications (Rx 112c), the format has been described above.

The static dictionary 112a is used for systematic tabulation 508 because diagnoses are used in the present example. The other dictionaries, 112b and 112c would be used if procedures and medications were in the example. The output data stream after systematic tabulation 510 results in three data items with a total of 52 bits (i.e., 15+18+19) for the present example which will be described in more detail below in reference to FIG. 12.

In order to achieve improved compression, implementations of the invention use the multiple "frequency-tuples" based static dictionaries 122 as discussed. This will potentially enable encoding multiple items at a time, resulting in a smaller (compressed) output bit stream.

Because it is known that the subject is a white female who is 56 years of age, this demographic information may also be useful. For example, implementations of the invention may take advantage of the age and sex information when using the frequency-tuples dictionary 122 (122a in this case for Dx) stored in computer readable media 58 in database 100. The corresponding patterns of disease, etc. related to age and sex within the woman's age band will be reflected in the frequency-tuples dictionary tables.

The first step is to perform an iterative search 512 through the diagnoses table 122 (or 122a) for female age group 44–65. A search is made for combinations of patterns which are possible using the patient's three diagnoses. The number of patterns are calculated 514 as (using the binomial combinatorial technique of the sum of three items taken one at a time, two at a time, and three at a time):

$$\text{Combinations}(3{:}3) = 3! / (0! \times 3!) = 1$$
$$\text{Combinations}(3{:}2) = 3! / (1! \times 2!) = 3$$
$$\text{Combinations}(3{:}1) = 3! / (2! \times 1!) = 3$$
$$\underline{\phantom{xxxxxxxxxxxxxxxxxxxxxxxxxxxxxxxxxxxxxxxxxxxxxx}}$$
$$7$$

Thus, in this example, there are seven possible patterns for the three diagnoses. We then search 516 through the female age 44–65 table (FIG. 10) of diagnoses to find all the matching patterns (slots). The search can be understood as follows. The frequency-tuples weighted dictionaries 122, which encode multiple items, comprise sets of tables with pointers (e.g., Recid's 114b) into the static dictionaries 112. There are, for example, six sets of tables in the database 100 which are organized (as discussed) by demographic groups—"Under-15", "Male15–44", "Female 15–44", "Male 44–65", "Female44–65", and "Over 65". Within each of these tables, information is organized by diagnoses (Dx) 134a, procedures (Px) 134b, medications (Rx) 134c, and diagnoses (Dx)/medications (Rx) 134d, combinations. For each of the Dx 134a, Px 134b, Rx 134c, and Dx/Rx 134d, a particular number of "slots" are identified, each having a corresponding slotid ("slot#") 136. The slot#'s 136 may range from 1 to that particular number. Each of the slot#'s 136, for example, for the Dx 134a, is a pointer to a particular combination of diagnoses 134a taken one at a time, two at a time, three at a time, four at a time, etc. (i.e., "tuples") the slot#'s 136 are ranked based on the highest Figure of Merit (FOM) value, as discussed above. The FOM is frequency based, weighted by the tuple number. For example, if a combination of two diagnoses (2 tuple) occurs in 90% of the population, and another combination of four diagnoses occurs in 40% of the population, then the FOMs would be 1.8 and 1.6, respectively. Therefore, in this example, the former combination would be ranked higher by slot# 136 than the latter combination. Thus, the FOM provides for weighting by the tuple value.

In FIG. 10, it is indicated that the particular number of slots that is identified may be, for example, $2^{11}$ or 2048. Thus, each slot# 136 may have a corresponding binary-equivalent designation as an 11 bit number ranging from 00000000000 to 11111111111. The Recid 114b entries in FIG. 10 show that Recid 114b "00001" had the highest FOM and is entered in Recid slot (slot-1) 138a for slot# 136 "1". This entry is a 1-tuple combination (i.e., it is a single item). Proceeding with slot# 136 "2", it is seen that a 3-tuple of Recids 114b is determined to have the next highest FOM. This entry is a combination of the three Recids 114b and hence it is a 3-tuple. Moving to slot# 136 "3", it is observed that the next entry is for a 4-tuple combination with Recids 114b entered in each of Recid slots 138a, 138b, 138c, and 138d. The description of the content of the next highest slot# 136 may be described in similar fashion and so on. It should be understood that in implementations of the invention, the order of Recids 114b in each slot# 136 is in sequence of Recid value with unfilled Recids of zero value. The top (e.g., 2048) slot#s 136 are ordered by FOM as described previously.

With dictionary 122, it may be possible to reduce the number of Recid items encoded in the output stream after system tabulation using dictionary 112. This process will be described below with reference to FIG. 12. Although FIG. 12 concerns diagnoses 134a, an analogous approach may be described for the procedures 134b, medications 134c, and diagnoses/medications combinations 134d (see FIG. 10). For the Dx/Rx combinations; "D" in FIG. 10 is included in the Recid slots 138a–d for Dx entries and "R" for Rx entries.

In compressing data for medical cards 10, it may be advantageous to exclude from dictionary 122 the sloths 136 with only a single pointer. This is because these slots could only achieve a three-bit improvement over the 14-bit systematic tabulation. The dictionary 122 may, therefore, be limited only to those combinations with two, three and four filled slots. This would allow more high tuple combinations in the tables and allow for further compression of the most likely diagnoses, procedures, medications, and diagnoses/medications combinations. Once we have the matching patterns (slots) from the dictionary 122, we then determine 518; (See FIG. 11B) which ones will result in the fewest number of data items in the output data stream from this second level of data compression.

Figure 12A:
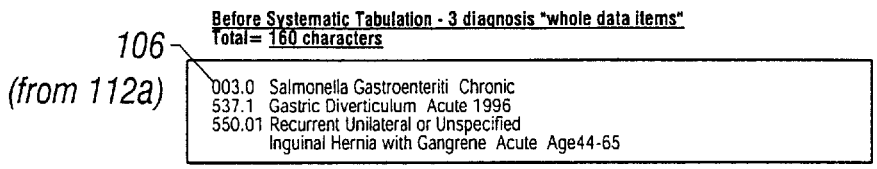
FIGS. 12(a)–12(e) are a representation of the encoding of personal medical information according to an implementation of the invention.
Figure 12B:
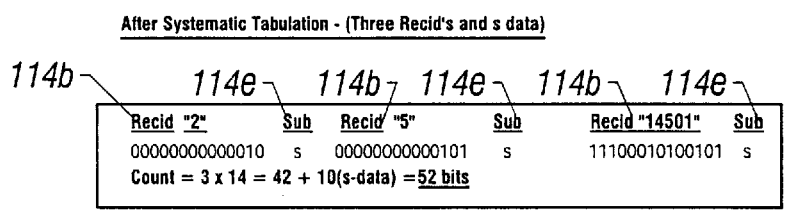

Referring now to FIG. 12(a), an implementation of the invention is further described. If we assume, for example, that the 56 year old female patient has three diagnoses 106 from dictionary 112 (112a in this case), the process of systematic tabulation will substitute three independent 14-bit Recid 114b pointers for the input stream data items in 12(a). The subsidiary bits 114e are appended to each of the Recid 114b pointers in the output data stream during systematic tabulation. Thus, after systematic tabulation, we have an output stream length of 52 bits (FIG. 12(b) consisting of three independent data items. The process continues with the next level of compression utilizing the frequency-tuples based dictionaries in FIG. 12(c). For this next level of compression, we do a search of the dictionaries 122 for combinations of the three diagnoses taken one at a time, two at a time, and three at a time. In this example, a two diagnosis combination is found (see FIG. 10), one identified in slot# "500", (i.e., Recids 114b "00002" and "00005"). No frequency-tuples slot combination is found which includes the third 14 bit Recid. This step reduces the number of output stream data items from three to two which results in a reduction in output stream bit length to 11 bits and the bits for the third item ("14501") plus subsidiary bits plus Ctl bits. The first two subsidiary bits 114e in FIG. 12(b) have been concatenated to subsidiary bits 142 "SS" for the new 11 bit item in the data stream and the subsidiary bits 114e "S" for the third item is retained. Although only two items have been combined into one slot pointer, a pattern (slot) for all three items would have been used if a matching pattern was found in the dictionary 122. For example, it may be possible to encode up to four items at a time depending on the patient's personal medical information and the contents of the dictionary 122.

Figure 12C:
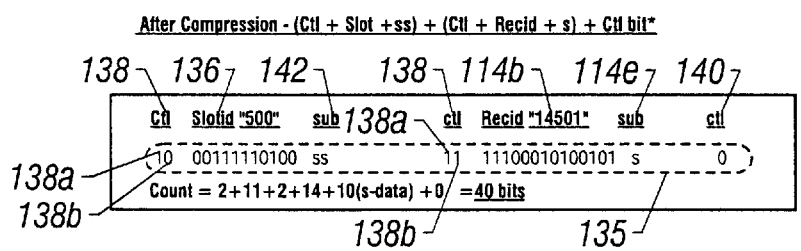

Thus, with a dictionary 122 pattern for two diagnoses (e.g., Female 44–65 diagnosis table element "500"), encoding is enabled 520, (see FIG. 11B) with, for example, only two entries in the output stream and accompanying subsidiary information 114d (bits) "S" and "SS" 142 and control (ctl) bits 138 and 140 (described below) as indicated in FIG. 12(c). A similar output stream could be produced for Px, Rx and Dx/Rx.

The overall output data items (bitstream 135) are encoded in groups where the first group is for the diagnoses, the second is for procedures, the third is for medications, and the last is for combinations of Dx/Rx. The bitstream 135 format for encoding of multiple items is as follows.

Ctl 138a 1 bit 0=group end, 1=Recid 114b or slotid 136 present Ctl 138b (shortened/Long) 1 Bit 0="short", 1="long" i.e., for Recid 114b or slotid pointer 136 14 bits for "long", 11 bits for "short"

The subsidiary data 114e for the long 14 bit diagnoses Recid 114b and the concatenated subsidiary data 142 for the short 11 bit slot pointer have the same format as previously described. If Rx entries were being used instead of Dx entries, then the subsidiary data could be data 114f.

The first bit of every output stream 135 is designated to be the control (ctl) bit 138a. If this bit is zero it indicates the end of a group (Dx, Px, Rx or Dx/Rx). In the present example, start off is expected with diagnoses, so if the Ctl bit 138a is on ("1"), then the first entry (136 or 114b) (portion of the stream 135 after Ctl bits 138a and 138b) will be a diagnosis. If the next Ctl bit 138a is also on, then another Dx entry (136 or 114b) follows and so on. However, if the next Ctl bit 138a is off ("0") this means that the Dx group has ended. The next bit could then be the Ctl bit 138a for the first Px entry. Each Px slot will have its Ctl bit 138a on until that group ends. The process continues similarly for Rx and Dx/Rx. Progression is made from group to group this way starting from Dx until the last of the Dx, Px, Rx, and Dx/Rx entries are processed 522, (see FIG. 11B). We then encode 524 a trailing zero Ctl bit 140 to indicate that the Dx/Rx group is ended. If Ctl bit 140 were a "1" instead of a "0", this would indicate that the current group (Dx, Px, Rx, Dx/Rx) is to continue and hence, bits 140 and 138a would be redundant. In this case, only one "0" bit is used and not two.

The next Ctl bit 138b in the stream 135 is the shortened/long bit which indicates whether the entry contains a "shortened" (e.g., 11-bit) item slotid 136 from the dictionary 122, or a "long" (e.g., 14-bit) single item Recid 114b from dictionary 112.

In the current example, explicitly writing out the bit format of the three individual diagnoses in the present example gives:

| Recid(Dx is 14 bits) | Acute/chronic | Yearly/ageband | Age <=4 yrs | Age band |
|---|---|---|---|---|
| 00 0000 0000 0010 | 0 | — | — | — |
| 00 0000 0000 0101 | 1 | 0 | 01 | — |
| 11 1000 1010 0101 | 1 | 1 | — | 110 |

The procedure has enabled Recids 114b to be replaced 526 with one or more shortened slotid pointers 136. The number of bits in the output data stream has therefore been reduced to:

over the basic systematic tabulation becomes more significant as we encode up to four items at a time.

Figure 12D:
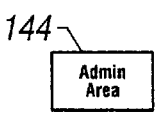

An ADMIN 144 area composed of bits is added 528 in a prefix to the stream 135. The ADMIN 144 bits and the slot (i.e., Recids 114b and/or Slotid pointers 136) groups constitute a completely encoded bitstream. The ADMIN area contains all the patient demographic data, dates, serial numbers, etc. and is shown in FIG. 12(d). Individual items are encoded to minimize bit size. Examples of these data are: system version no.; database version no.; geographic area; date card 10 last updated; patient age; sex, race, height, weight, blood type; last Tetanus shot; social history; security.

The group of bits described above (ADMIN plus slot groups) are concatenated together so that there are no apparent boundaries from data item to data item. The ability to decipher this bitstream may be in the forward direction only. The bitstream is then encrypted 530, (see FIG. 11B) for privacy and access security reasons. Well known advanced key encryption methods may be employed incorporating a password. A user-chosen password is incorporated in the bitstream for access protection, as well.

Error checking bits are then added 532, for example, error checking bits are added to the bitstream for checking for reversal of characters using word-letter weighting, and enabling retyping only current word or line, if error. These error bits may be interspersed periodically with the data bits in the bitstream. Once the error bits are inserted, the output bitstream is converted 536 to vocabulary symbols 141 (FIG. 12(e)).

For example, a 32 symbol vocabulary may be chosen for human convenience and ease of use, visually and orally. The numerals and uppercase letters chosen may reduce ambiguity that exists in using the full 36 possible uppercase letters and numerals. The number of symbols, 32, is optimal because it is an exact binary value, where no vocabulary symbols are wasted during the output stream encoding step. A character 143 (e.g., "A", "B", "C", etc.) (see FIG. 12(e)) may be defined, for example, as a fixed 5-bit group of bits, and replace 5 bits in the bitstream after error checking bits are added, thereby expressing all the previous bit values within these 5 bit symbols.

Figure 12E:
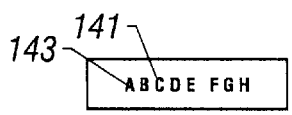

There may be no loss of compression efficiency during this converting phase. Of course, if the compression ratio were the only important criteria in implementations of the invention, a larger vocabulary could have been chosen that may reduce the number of output symbols required to encode a given stream of bits even further. For example, if a 256 symbol vocabulary were chosen instead, each of these symbols could have encoded 8 bits in the output stream. But a vocabulary of 256 symbols may not be easily readable by humans or recited easily over the telephone. For the example discussed above, the conversion to symbols of the bitstream in FIG. 12(c) is shown in FIG. 12(e).

| Ctl Start/Stop | Short/long | Recid(14)/slot(11) | Subsidiary data | Total |
|---|---|---|---|---|
| 1 | short 0 | 001 1111 0100 | Recid (2) + Recid (5) = 5 bits | 18 |
| 1 | long 1 | 11 1000 1010 0101 | Recid (14,501) = 5 bits | 21 |
| 0 | DX Group end | | | 1 |
| | | | | 40 |

The above output stream 135 of FIG. 12(c), therefore, consists of two items and 40 bits. Recalling that the encoding of items one at a time required 52 bits, we have a compression ratio of 52/40 or 1.30 to 1. The improvement After conversion to symbols 141, the resulting symbols 141 are grouped 540 (see FIG. 11B), under control of encoding and/or translating PC 54 into words (similar to words 21), lines (similar to lines 22), and sections (similar to sections 26, 27) for storage on the computer-readable medium 58, or for printing onto card 10. A word may be defined as 5 characters or a fixed 25 bits. Each word of symbols 141 may be separated with a space for readability. A line may be defined as 5 words, or a fixed 125 bits.

Each of the words and lines has the error checking bits included to minimize errors in human transmission. During the translating phase, the code may be dictated at one end of a telephone to a PC at the other end where it may be typed in by hand. When an error in dictation occurs, the error may only require the retyping of the current word, a maximum of 5 characters. This may save time and operate more efficiently in real life circumstances. If there is an error detected at the end of the code line, then the line may have to be retransmitted or redictated. The same holds true for whole sections (i.e., larger sections of symbol 141) error checks.

Implementations of the invention may use 5 lines on a card 10. As previously described, the end of a section may be marked with a symbol, for example, a + symbol. The first section (similar to section 26) of the code of symbols 141 may be for emergency data and demographic details of the patient (see FIG. 1). As previously described, the second section (similar to section 27) may contain non-emergency medical history information, e.g., family history, gynecological history, childhood immunizations, etc. The code comprised of symbols 141 may be designed to be processed quickly for emergency purposes.

Although the preferred forms have been disclosed, the scope of the invention is not limited to these preferred forms. Other embodiments having equivalent structure, function, or acts would occur to those having ordinary skill in the art. These other embodiments are included within the scope of the invention which is limited only by the claims below.

What is claimed is:

1. A method of data compression of various items of patient medical information including any one or more of the following: medical diagnoses associated with the patient, medicines the patient has taken or currently takes, and medical procedures the patient has undergone, the method comprising:

(a) searching a structured medical database classification comprising a plurality of records in which each record includes a medical description and an associated key value;

(b) if a match is found between an item of a particular patient's medical information and a record in the structured medical database classification, selecting the associated key value;

(c) repeating (a) and (b) for other items of patient medical information, if any;

(d) if multiple key values have been selected for multiple items of the patient's medical information, searching a combination medical description database comprising a plurality of records in which each record comprises one or more of said key values representing a combination of patient medical descriptions and an associated slot identifier value to uniquely identify the combination; and (e) if a patient has multiple items of medical information and if a match is found between a combination of items of the patient's medical information and a combination of key values in a record in the combination medical condition database, selecting the slot identifier value associated with the matching record from the multiple medical condition database.

2. The method of claim 1 wherein said patient medical descriptions comprise any one or more of diagnoses, procedures, and medicines.

3. The method of claim 1 further including combining the slot identifier values, if any, selected in (d) with the key values selected in (b).

4. The method of claim 3 further including:

(f) converting the combined values to alphanumeric characters.

5. The method of claim 4 wherein (f) comprises representing the combined values as binary numbers, selecting groups of an integer number of said binary numbers and selecting an alphanumeric character for each group of binary numbers.

6. The method of claim 5 further including transmitting said compressed data over a network connection.

7. The method of claim 4 wherein (f) comprises representing the combined values as binary numbers, selecting groups of 5 binary numbers and selecting one of 32 unique alphanumeric characters for each group of 5 binary numbers.

8. The method of claim 4 further including printing said alphanumeric characters representing the patient medical information.

9. The method of claim 1 further including combining the slot identifier values, if any, selected in (d), the key values selected in (b) with supplemental data.

10. The method of claim 9 wherein said supplemental data provides additional information regarding the patient medical descriptions identified by the slot identifier and key values.

11. The method of claim 9 wherein said supplemental information includes bits that represent information of a type selected from the group consisting of representation of patient age, acute or long term medicine, variable strength, medicine consumption frequency, and acute or chronic medical condition.

12. The method of claim 1 further including receiving said medical information for a patient from a remote electronic device over a network connection.

13. The method of claim 12 further including combining the slot identifier values, if any, selected in (d) with the key values selected in (b) and transmitting the combination of slot identifiers and key values back across the network connection.

14. The method of claim 1 wherein said structured medical database classification includes ICD9, CPT, and NDC codes.

15. A method of creating a medical information database of records to be used to compress and decompress patient medical information, comprising:

(a) associating key values with a plurality of items of medical information, each of said key values uniquely identifying the associated item of medical information;

(b) creating combinations of said items of medical information, each combination representing a medical condition that a human may experience;

(c) associating a slot identifier value with each combination created in (b); and (d) sorting the combinations created in (b) using a figure of merit that represents a relative frequency of occurrence of the combination in a human population.

16. The method of claim 15 wherein the plurality of items of medical information in (a) comprises structured database classifications.

17. The method of claim 15 wherein said structured database classifications include ICD and NDC codes.

18. The method of claim 15 wherein the population in (d) comprises a plurality of sub-populations, and (a)–(d) are repeated for each of the other sub-populations.

19. The method of claim 15 wherein (d) includes determining the figure of merit by multiplying the frequency of occurrence of the combination in the population by the number of items of medical information in the associated combination, and sorting the combinations in order of said figure of merit.

20. The method of claim 15 further including appending new items of medical information to said database and assigning unique key values to the new items.

21. The method of claim 15 further including updating an existing entry in said database by appending a new item of information representing the updated item to the database, associating a unique key value to the new item and linking the old item to the new item.

22. A computer system usable to perform data compression and decompression of patient medical information, comprising:

a microprocessor;

an input device coupled to said microprocessor;

a display coupled to said microprocessor;

a computer readable storage medium coupled to said microprocessor containing encoder software and a database;

said database including a plurality of individual medical item records with each individual medical item record having a single medical item that is part of a medical classification system and an associated key value distinctly identifying the item, said database also including a plurality of combination records with each combination record including a combination of more than one medical item and an associated slot identifier value distinctly identifying the combination, the combination representing a medical description;

said encoder software receives a plurality of items of medical information for a patient from the input device and compresses the patient's medical information using said database by searching the database for various combinations of items of the patient's medical information and, if a match is found in the database, replacing each matched combination of items with the associated slot identifier value.

23. The computer system of claim 22 wherein said encoder software combines slot identifier values and, to the extent any medical information items cannot be matched as combinations to combination records in the database, key values of unmatched medical information items to produce a binary representation of the combined slot identifier and key values.

24. The computer system of claim 23 wherein said encoder software converts said binary representation to alphanumeric characters.

25. The computer system of claim 23 said encoder software converts said binary representation to alphanumeric characters by selecting five sequential bits in said binary representation and selecting an alphanumeric character corresponding to the selected five bit value.

26. The computer system of claim 25 wherein the alphanumeric characters consist of 32 unique characters.

27. The computer system of claim 22 further including translator software that receives a string of alphanumeric characters from the input device, the string of alphanumeric characters representing compressed medical information for a patient, and converting the string of alphanumeric characters to uncompressed medical information.

28. The computer system of claim 22 wherein said input device is part of an electronic device remotely coupled to said computer system.

29. The computer system of claim 22 wherein said input device is coupled to said computer system via the Internet.

30. The computer system of claim 22 wherein said database includes medical structured database classifications.

31. A method of data compression of input data into compressed data, the input data comprising patient-specific medical history items, including one or more of the following: medical diagnoses, surgical procedures, and medications, and using a set of primary dictionaries with each dictionary in the set being associated with one of the types of patient-specific medical history items, the method comprising:

(a) searching the primary dictionary which comprises a structured medical database classification and which contains a plurality of records in which each record comprises a standardized medical description or name, a standardized code, and a uniquely assigned key value;

(b) if a match is found between an input item of patient-specific medical history information and a record in its primary dictionary, selecting the associated key value and adding it to a systematic tabulation;

(c) repeating (a) and (b) for each item of input data to produce a systematic tabulation for each type of input item, said systematic tabulation comprises one key value for each item of input data;

(d) from each systematic tabulation, preparing a table of combinations of all possible combinations of key values in each systematic tabulation taken one at a time, two at a time, three at a time and four at a time;

(e) searching a secondary dictionary selected from a set of secondary dictionaries with each secondary dictionary being associated with one of the types of patent-specific medical history and a subpopulation category, and which contains a plurality of records in which each record comprises one or more of said key values representing a combination of medical data items and an associated slot identifier value to uniquely identify the combination;

(f) comparing each combination of keys in the table of combinations to the records in the secondary dictionary, and if a match is found between a combination of keys representative of the patient's medical history information and the key values in a record in the secondary dictionary, selecting the slot identifier value associated with the matching record in the secondary dictionary;

(g) repeating (e) and (f) until all tables of combinations have been searched for matches;

(h) searching through the matching combination records at least once to select the minimum number of slot identifier values to account for as many as possible of the items in each systematic tabulation from (c) above; and (i) repeating (h) above for each type of medical history item to include the slot identifier values for the minimum number of combination records along with the key values from the systematic tabulation in (c) above for those individual items not accounted for.

32. The method of claim 31 further including combining the slot identifier values, if any, selected in (i) along with the key values selected in (c) but unaccounted for in (i).

33. The method of claim 32 further including:

(j) converting the compressed data to alphanumeric characters.

34. The method of claim 33 wherein (j) comprises representing the compressed data as binary numbers, selecting groups of an integer number of said binary numbers and selecting an alphanumeric character for each group of binary numbers.

35. The method of claim 33 wherein (j) comprises representing the compressed data as binary numbers, selecting groups of 5 binary numbers and selecting one of 32 unique alphanumeric characters for each group of 5 binary numbers.

36. The method of claim 33 further including printing said alphanumeric characters representing the compressed patient medical information.

37. The method of claim 31 further including combining the slot identifier values, if any, selected in (i) along with the key values selected in (c) but unaccounted for in (i), with supplemental data.

38. The method of claim 37 wherein said supplemental data provides additional information regarding the patient medical history items identified by the slot identifier and key values.

39. The method of claim 31 wherein said supplemental information includes bits that represent information specific to each type of item comprising representation of patient age, acute or long term medication, medication strength, medication dosage frequency, recurrent or non-recurrent medical diagnoses, and single or multiple surgical procedures.

40. The method of claim 31 wherein said structured medical database classification includes ICD9-CM, CPT, and NDC.

41. A method of creating a primary dictionary of records from a structured medical database classification to be used to compress and decompress patient medical history information, comprising:
(a) associating key values with a plurality of items of medical information, each of said key values uniquely identifying the associated item of medical history information;
(b) creating combinations of said items of medical history information, each combination representing a medical condition that a human may experience;
(c) associating a slot identifier value with each combination created in (b); and
(d) sorting the combinations created in (b) using a figure of merit that represents a relative frequency of occurrence of the combination in a human population.

42. The method of claim 41 wherein the plurality of items of medical history information in (a) comprises structured database classifications.

43. The method of claim 41 wherein said structured database classifications include ICD9-CM, CPT and NDC.

44. The method of claim 41 wherein the population in (d) comprises a plurality of sub-populations, and (a)–(d) are repeated for each sub-population.

45. The method of claim 41 wherein (d) includes determining the figure of merit by multiplying the frequency of occurrence of the combination in the population by the number of items of medical information in the associated combination, and sorting the combinations in order of said figure of merit.

46. The method of claim 41 further including appending new items of medical history information to said database and assigning unique key values to the new items.

47. The method of claim 41 further including updating an existing entry in said primary dictionary by appending a new item of information representing the updated item to the dictionary, associating a unique key value to the new item and identifying the new item with an updated release number.

48. A computer system usable to perform data compression and decompression of patient medical history information, comprising:
a microprocessor;
an input device coupled to said microprocessor;
a display coupled to said microprocessor;
a computer readable storage medium coupled to said microprocessor containing encoder software, decoder software and a primary and secondary dictionary;
said primary dictionary including a plurality of individual medical item records which are derived from a structured medical database classification with each record consisting of a standardized medical description, a standardized code, and an associated key value uniquely identifying the item, and
said secondary dictionary including a plurality of records each comprising of a combination of up to four key values, where each key is associated with an individual record in the primary dictionary, and an associated slot identifier value uniquely identifying the combination record:
said encoder software receives a plurality of items of uncompressed medical information for a patient and compresses the patient's medical information using said primary and secondary dictionaries.

49. The computer system of claim 48 wherein said encoder software:
searches the primary dictionary for a match for each item of the patient's medical information and selects the associated key value of the matching primary dictionary item;
forms a table of combinations of the selected key values taken one at a time, two at a time, three at a time, and four at a time;
searches the secondary dictionary for combination records which match entries in the table of combinations, and selects the associated slot identifier values;
performs one or more passes through the selected slot identifier values to select the minimum number of slot identifier values to account for a maximum number of patient medical items, and for patient medical items whose associated key values are not selected in combinations, these key values are selected individually.

50. The computer system of claim 49 wherein said encoder software further converts said selected slot identifier values to a stream of binary digits that includes error checking and then represents groups of five binary digits as alphanumeric characters.

51. The computer system of claim 49 wherein said encoder software converts said binary representation to alphanumeric characters.

52. The computer system of claim 49 said encoder software converts said binary representation to alphanumeric characters by selecting five sequential bits in said binary representation and selecting an alphanumeric character corresponding to the selected five bit value.

53. The computer system of claim 48 wherein said decoder software receives compressed medical history information in the form of a stream of alphanumeric characters representative of a patient's medical history from the input device and decompresses the information using said primary and secondary dictionaries by:
converting the alphanumeric characters into a contiguous stream of binary information where five binary digits are substituted for each alphanumeric character;

deciphering the binary information into groups of patient medical history data comprising patient demographics, allergies, immunizations, screening information, donor and directives information; and deciphering further binary information into groups of items of patient medical history information comprising diagnoses, surgical procedures and medications, each of which is comprised of individual key values for items to be found in the primary dictionary, slot identifier values for records to be found in the secondary dictionary, said records comprising combinations of one or more key values for items to be found in the primary dictionary, and supplemental information for each immediately preceding key value.

54. The computer system of claim 53 wherein the alphanumeric characters consist of 32 unique characters.

55. The computer system of claim 48 wherein said encoder software combines slot identifier values and, to the extent any medical information items cannot be matched as combinations to combination records in the database, key values of unmatched medical information items to produce a binary representation of the combined slot identifier and key values.

56. The computer system of claim 48 further including translator software that receives a string of alphanumeric characters from the input device, the string of alphanumeric characters representing compressed medical information for a patient, and converting the string of alphanumeric characters to uncompressed medical information.

57. The computer system of claim 48 wherein said input device is part of an electronic device remotely coupled to said computer system.

58. The computer system of claim 48 wherein said input device is coupled to said computer system via the Internet.

59. The computer system of claim 48 wherein said database includes medical structured database classifications.

* * * * *